(12) United States Patent
Vallath et al.

(10) Patent No.: US 9,775,110 B2
(45) Date of Patent: Sep. 26, 2017

(54) POWER SAVE FOR VOLTE DURING SILENCE PERIODS

(71) Applicant: Apple Inc., Cupertino, CA (US)

(72) Inventors: Sreevalsan Vallath, Dublin, CA (US); Carola Faronius, Järfälla (SE)

(73) Assignee: Apple Inc., Cupertino, CA (US)

( * ) Notice: Subject to any disclaimer, the term of this patent is extended or adjusted under 35 U.S.C. 154(b) by 36 days.

(21) Appl. No.: 14/497,148

(22) Filed: Sep. 25, 2014

(65) Prior Publication Data

US 2015/0351028 A1 Dec. 3, 2015

Related U.S. Application Data

(60) Provisional application No. 62/005,881, filed on May 30, 2014.

(51) Int. Cl.
*H04W 52/02* (2009.01)
*H04W 24/02* (2009.01)
*H04L 29/06* (2006.01)

(52) U.S. Cl.
CPC ..... *H04W 52/0209* (2013.01); *H04L 65/1006* (2013.01); *H04W 24/02* (2013.01); *Y02B 60/50* (2013.01)

(58) Field of Classification Search
CPC ............. H04W 52/0209; H04W 24/02; H04W 76/048; H04W 76/04; H04W 52/00–52/02; H04L 65/1006
(Continued)

(56) References Cited

U.S. PATENT DOCUMENTS

| 5,960,389 | A | * | 9/1999 | Jarvinen | ............... | G10L 19/012 |
| | | | | | | 704/215 |
| 6,101,466 | A | | 8/2000 | Rao et al. | | |

(Continued)

FOREIGN PATENT DOCUMENTS

WO 2005034381 A1 4/2005

OTHER PUBLICATIONS

3GPP TS 26.171 V6.0.0 (Dec. 2004).
(Continued)

*Primary Examiner* — Charles C Jiang
*Assistant Examiner* — Rose Clark
(74) *Attorney, Agent, or Firm* — Downey Brand LLP

(57) ABSTRACT

Methods and apparatus for reducing power consumption in a wireless device operating in a discontinuous transmission (DTX) mode while using a voice over Long Term Evolution (VoLTE) service. The wireless device detects a period of voice inactivity and transmits one or more silence descriptor (SID_UPDATE) frames to a second wireless device in place of encoded speech frames. The SID_UPDATE frames are transmitted periodically based on measurements of comfort noise parameters. The wireless device determines a difference between weighted averages of comfort noise (CN) parameters of two sequences of encoded speech frames. When the difference exceeds a difference threshold, a SID_UPDATE frame is transmitted. Additionally, in some embodiments, a SID_UPDATE frame is transmitted when the weighted average of CN parameters exceeds a parameter threshold and/or when a time between SID_UPDATE frames or time elapsed after entering a silence state exceeds one or more time thresholds.

20 Claims, 14 Drawing Sheets

(58) Field of Classification Search
USPC .................. 704/226–228, 233, 206, 201
See application file for complete search history.

(56) References Cited

U.S. PATENT DOCUMENTS

| | | | | |
|---|---|---|---|---|
| 6,269,331 | B1* | 7/2001 | Alanara et al. | G10L 19/012 704/205 |
| 6,347,081 | B1* | 2/2002 | Bruhn | H04W 52/0216 370/337 |
| 8,296,132 | B2 | 10/2012 | Zhang et al. | |
| 2003/0065508 | A1* | 4/2003 | Tsuchinaga et al. | G10L 19/012 704/215 |
| 2004/0110539 | A1* | 6/2004 | El-Maleh | G10L 19/173 455/563 |
| 2006/0149536 | A1* | 7/2006 | Li | G10L 19/012 704/215 |
| 2006/0293885 | A1* | 12/2006 | Gournay et al. | G10L 19/012 704/223 |
| 2007/0147327 | A1* | 6/2007 | Jin et al. | H04W 76/04 370/342 |
| 2013/0148579 | A1* | 6/2013 | Das et al. | H04W 28/20 370/328 |
| 2013/0272260 | A1 | 10/2013 | Bitran et al. | |
| 2013/0308508 | A1 | 11/2013 | Ji et al. | |
| 2014/0126443 | A1* | 5/2014 | Chizgi et al. | H04W 52/02 370/311 |
| 2014/0286210 | A1* | 9/2014 | Das | H04L 1/201 370/311 |
| 2014/0286214 | A1* | 9/2014 | Chui | H04W 76/048 370/311 |
| 2015/0131503 | A1* | 5/2015 | Sandberg et al. | H04W 52/0235 370/311 |
| 2015/0235648 | A1* | 8/2015 | Jansson Toftgard | G10L 19/012 704/226 |
| 2016/0005409 | A1* | 1/2016 | Bruhn | G10L 25/84 704/226 |

OTHER PUBLICATIONS

3G TS 26.071 V1.0.0 (Apr. 1999).
ETSI EN 300 729 V8.0.1 (Nov. 2000).
ETSI TS 126 171 V10.0.0 (Apr. 2011).
3GPP TS 26.193 V9.0.0 (Dec. 2009).
3GPP TS 26.092 V11.0.0 (Sep. 2012).
ETSI EN 300 964 V8.0.1 (Nov. 2000).
ETSI EN 300 972 V8.0.1 (Nov. 2000).
3GPP TS 06.93 V7.5.0 (Dec. 2000).
3GPP TS 46.081 V10.0.0 (Mar. 2011).
3GPP TS 26.194 V11.0.0 (Sep. 2012).
3GPP TS 26.192 V11.0.0 (Sep. 2012).
3GPP TS 26.193 V11.0.0 (Sep. 2012).
3GPP TS 26.093 V11.0.0 (Sep. 2012).
ETSI TS 126 101 V11.0.0 (Oct. 2012).
3GPP TS 26.101 V10.0.0 (Mar. 2011).
3GPP TS 26.201 V9.0.0 (Dec. 2009).
ETSI TS 126 102 V8.1.0 (Jan. 2009).

* cited by examiner

Table 1: TX TYPE identifiers

| TX_TYPE Legend | Information Bits | Mode Indication |
|---|---|---|
| SPEECH_GOOD | speech frame, size 95..244 bits depending on codec mode; no errors known. | current code mode |
| SPEECH_DEGRADED (only in downlink in TFO) | Speech frame, size 95..244 bits, depending on codec mode; there might be errors in class 2 bits. | current codec mode |
| SPEECH_BAD (only in downlink in TFO) | Speech frame, size 95..244 bits, depending on codec mode; there are errors in class 1 bits. | current codec mode |
| SID_FIRST | marks the end of a talkspurt, respectively the beginning of a speech pause; does not contain information bits. | the codec mode that would have been used if TX_TYPE had been SPEECH |
| SID_UPDATE | comfort noise, 35 bits; no errors known | the codec mode that would have been used if TX_TYPE had been SPEECH |
| SID_BAD (only in downlink in TFO) | comfort noise, 35 bits; errors detected, parameters unusable | the codec mode that would have been used if TX_TYPE had been SPEECH |
| ONSET (only in downlink in TFO) | announces the beginning of a speech burst; does not contain information bits | the codec mode of the following speech frame |
| NO_DATA | no useful information | no useful information |

FIG. 2B

Table 1: RX_TYPE identifiers

| RX_TYPE Legend | Description |
|---|---|
| SPEECH_GOOD | Speech frame with CRC OK, Channel Decoder soft values also OK |
| SPEECH_DEGRADED | Speech frame with CRC OK, but 1B bits and class2 bits may be corrupted |
| SPEECH_BAD | (likely) speech frame, bad CRC (or very bad Channel Decoder measures) |
| SID_FIRST | first SID marks the beginning of a comfort noise period |
| SID_UPDATE | SID update frame (with correct CRC) |
| SID_BAD | Corrupt SID update frame (bad CRC; applicable only for SID_UPDATE frames) |
| ONSET | ONSET frames precede the first speech frame of a speech burst |
| NO_DATA | Nothing useable (for the speech decoder) was received. This applies for the cases of no received frames (DTX) or received FACCH or RATSCCH or SID_FILLER signalling frames. |

FIG. 2C

POWER SAVE FOR VOLTE DURING SILENCE PERIODS

CROSS-REFERENCE TO RELATED APPLICATIONS

This application claims the benefit of U.S. Provisional Patent Application No. 62/005,881, filed May 30, 2014, and entitled "POWER SAVE FOR VOLTE DURING SILENCE PERIODS," which is incorporated by reference herein in its entirety for all purposes.

FIELD

The described embodiments generally relate to reducing power consumption in wireless user equipment (UE), and more particularly, to methods and apparatus for power saving while using a voice over Long Term Evolution (VoLTE) service and operating in a discontinuous transmission (DTX) mode.

BACKGROUND

Battery life is a significant concern for UEs such as smartphones. Broadband radios, large touch screen displays and gigahertz multi-core processors consume a substantial amount of energy. Therefore, power optimization that improves battery life is important to both mobile network operators and smartphone manufacturers. The main components affecting power consumption during voice calls are cellular radio transmitters and receivers including voice codec components. Usually the UE's display is turned off by a trigger from either a proximity sensor or a timer.

Energy saving for cellular radio transmission and reception in the UE can be achieved by turning off transmission and/or reception whenever possible. With the introduction of IP networks, voice over IP (VoIP) systems have been introduced. One implementation of a VoIP system includes a voice over Long Term Evolution (VoLTE) system. In VoLTE systems, one mechanism to manage the operation of transmitters and receivers of the UE is Discontinuous Transmission (DTX) and Discontinuous Reception (DRX). A DTX mechanism uses a silence descriptor (SID) frame to minimize power consumption by the UE when there is a period of voice inactivity. Rather than send "silent" frames, the UE can send a SID frame periodically, e.g., every eight frames, during the period of voice inactivity to reduce transmissions and to reduce power consumption of the UE. While the SID mechanism provides an improvement in power performance, it is desirable to develop apparatuses and methods that can further optimize power consumption at the UE, e.g., by managing adaptively the generation and transmission of SID frames.

SUMMARY

Power consumption is a challenge for user equipment (UE) when providing a voice over Long Term Evolution (VoLTE) service. One method to reduce power consumption by a UE is to operate using a discontinuous mode, e.g., discontinuous reception (DRX) and/or discontinuous transmission (DTX). In a DTX mode, the UE can turn off its transmitter and minimize functions of the receiver when there is a period of voice inactivity. A DTX mechanism uses transmission of a SID frame in place of a continuous transmission of packetized silent periods to optimize power savings at the UE. A SID frame can be a SID_UPDATE frame or a SID_FIRST frame. A SID_FIRST frame can indicate the beginning of a DTX mode of operation or period. A SID_UPDATE frame can contain comfort noise (CN) parameters that convey information on the acoustic background noise. As described herein, the term "SID frame" generally refers to the functions of a SID_UPDATE frame.

A UE can include a speech codec, such as an adaptive multi-rate (AMR) codec or an Adaptive Multi-Rate Wideband (AMR-WB) to convert analog speech signals into digital packets for transmission over a wireless network. A speech codec can have two states, SPEECH and SILENCE for use in a DTX mode. A state of SILENCE indicates voice inactivity, while a state of SPEECH indicates voice activity. A speech codec includes a voice activity detector (VAD) that can allow the speech codec to reduce the number of transmitted bits and packets during a silent period. In advance of a silent period of voice inactivity, the speech codec computes CN parameters that characterize a background noise level and subsequently transmits the CN parameters to a receiver of an endpoint device to which the UE is connected. Sending the CN parameters at regular intervals during silent periods can be includes as part of the DTX mode of operation. In response to detecting a state of voice inactivity, while operating in the DTX mode, the UE transmits SID frames to inform the receiver of the endpoint device of the voice inactivity and to provide instructions to terminate most receiver functions during the silent period. The endpoint device can generate CN during the silent period based on the received CN parameters. Subsequently, after sending the SID frames, the UE suspends operation of its transmitter to reduce power consumption until sending a following SID frame. Thus, both the transmitting UE and the receiving endpoint device can conserve power by using the DTX mode with voice activity/inactivity detection. The use of speech inactivity detection with SID frame communication to reduce average transmission rates in a DTX mode of operation is also referred to as a Source Controlled Rate (SCR) operation.

While in a SILENCE state, the UE transmits SID_UPDATE frames, containing CN parameters that convey information on the acoustic background noise. A SID_UPDATE frame can be sent periodically, e.g., every eight frames (160 ms), to control the operation and power consumption of the UE. The CN parameters can be based on measurements of immittance spectral frequency (ISF) or line spectral frequency (LSF) determined by the transmitting UE. When a receiver of the endpoint device receives a SID_UPDATE frame with CN parameters, the endpoint device can generate a similar background noise, which can be referred to as "comfort noise", to provide to the listener during the silent period.

Embodiments described herein further minimize power consumption by a transmitting UE during a SILENCE state while maintaining an acceptable quality of service. A representative method utilizes the CN parameters in order to control transmission of the SID frames. By utilizing the CN parameters, a decision is made whether to send a SID_UPDATE frame, when to send a SID_UPDATE frame, how often to send SID_UPDATE frames, to control transmission of the SID_UPDATE frames, while balancing quality requirements. A comparison of current (e.g., most recently determined) weighted averages of CN parameters to one or more previous (e.g., determined earlier) weighted averages of CN parameters can be used by the transmitting UE to determine when to transmit any SID_UPDATE frames. Specifically, a difference is determined between 1) a weighted average of one or more CN parameters for a most recent sequence of encoded speech frames and 2) a weighted average of one or more CN parameters for a previous sequence of encoded speech frames. When the difference between the weighted averages is greater than a difference threshold, a SID_UPDATE frame can be transmitted by the UE to the receiving endpoint device. The current weighted average of one or more CN parameters is determined by averaging over a most recent sequence of encoded speech frames. The most recent sequence of encoded speech frames (or more generally, a first sequence of encoded speech frames) and a previous sequence of encoded speech frames (or more generally, a second sequence of encoded speech frames) each can span an identical number of consecutive speech frames. The sequences of encoded speech frames can also overlap by at least one speech frame and be offset from each other by at least one speech frame. A speech frame can be a digitized and encoded data representation of audio speech, e.g., an output of a speech encoder.

Increasing an averaging time period over which weighted averages of CN parameters are calculated and increasing time between successive SID_UPDATE frame transmissions, e.g., from a time period of eight speech frames, as defined in one or more 3rd Generation Partnership Project (3GPP) specifications and/or customarily used, to an extended time period of N*8 speech frames, where N>1, can also reduce power consumption. SID_UPDATE frames can then be transmitted every N*8 speech frames rather than every eight speech frames. Furthermore, there can be additional benefits when the aforementioned methods are combined, e.g., a method can both increase an averaging time period to a sequence of N*8 encoded speech frames, where N>1, and can also apply a difference threshold for determining whether to transmit a SID_UPDATE frame. The averaging period can be increased, as well as a difference threshold can be used to limit SID_UPDATE frame transmissions to circumstances in which a "sufficient" difference in the weighted average of the CN parameters occurs. This combined approach can further reduce power consumption at the UE.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

FIG. 2B illustrates Table 1 listing a set of TX_TYPE identifiers, in accordance with some embodiments.

FIG. 2C illustrates Table 2 listing a set of RX_TYPE identifiers, in accordance with some embodiments.

DETAILED DESCRIPTION

Figure 1:
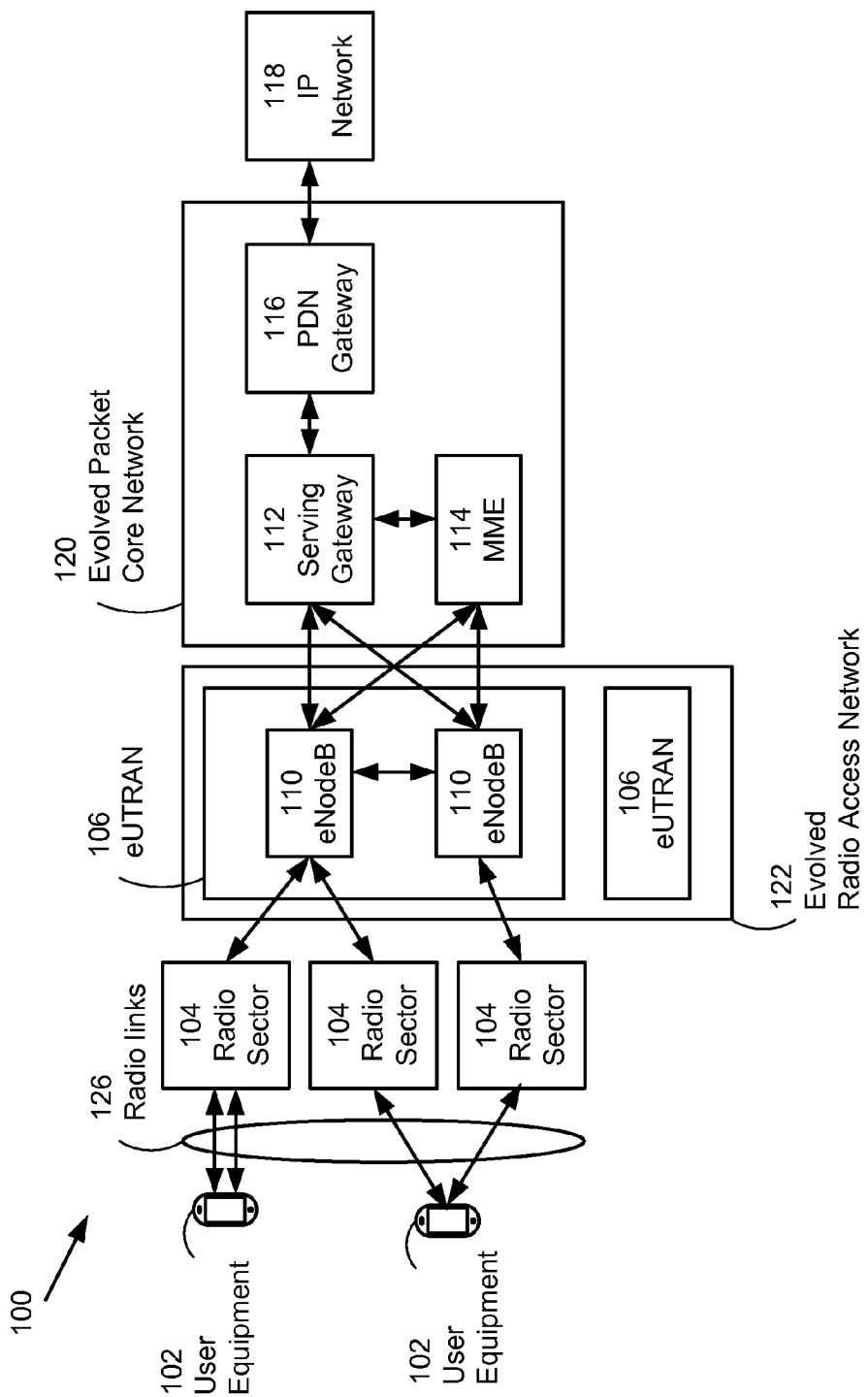
FIG. 1 illustrates a Long Term Evolution (LTE) wireless communication system, in accordance with some embodiments.

Reference will now be made in detail to representative embodiments illustrated in the accompanying drawings. Although the embodiments of this disclosure are described in sufficient detail to enable one having ordinary skill in the art to practice the described implementations, it should be understood that these examples are not to be construed as being overly-limiting or all-inclusive. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Representative examples of methods to save power in UEs, especially in the discontinuous transmission mode are provided herein. These examples are provided to add context to, and to aid in the understanding of, the subject matter of this disclosure. It should be apparent that the present disclosure may be practiced with or without some of the specific details described herein. Further, various modifications and/or alterations can be made to the subject matter described herein, and illustrated in the corresponding figures, to achieve similar advantages and results, without departing from the spirit and scope of the disclosure.

In accordance with various embodiments described herein, the terms "wireless communication device," "wireless device," "mobile device," "mobile station," and "user equipment" (UE) may be used interchangeably herein to describe one, or any number of, common consumer electronic device(s) that may be capable of performing procedures associated various embodiments the disclosure. In accordance with various implementations, any one of these consumer electronic devices may relate to: a cellular phone or a smart phone, a tablet computer, a laptop computer or a netbook computer, a media player device, an electronic book device, a MiFi® device, as well as any other type of electronic computing device having fourth generation (4G) LTE and LTE Advanced (LTE-A) communication capabilities. In various embodiments, these capabilities may allow a respective UE to communicate within various 4G network cells that can employ any type of LTE-based radio access technology (RAT). A UE can communicate with network equipment such as a base transceiver station (BTS).

A Long Term Evolution (LTE) wireless communication system is an advanced generation wireless communication system and is sometimes referred to as a fourth generation (4G) wireless communication system. Specifications for LTE are provided by the 3rd Generation Partnership Project (3GPP), which unites six telecommunications standard development organizations (ARIB, ATIS, CCSA, ETSI, TTA, TTC), known as "Organizational Partners" and provides their members with a stable environment to produce Reports and Specifications that define 3GPP technologies.

New generation mobile communication systems based on LTE technologies aim to provide to customers a new mobile experience by providing higher data rates and lower latencies to support new services and applications. However, the energy requirements for these new services and applications can be very demanding of limited battery power sources in mobile wireless devices, such as UEs. The development of new architectures and procedures to build power-efficient and power-aware systems is a high priority in the design of new generation wireless networks and wireless devices.

Voice over IP (VoIP) is an important service in 4G wireless communication networks. One VoIP method is known as Voice over LTE (VoLTE). This VoIP method is based on the IP Multimedia Subsystem (IMS) network, with specific profiles for control and media planes of voice service on LTE. This VoIP method results in a voice service (control and media planes) being delivered as data flows within an LTE data bearer. Thus, there is no dependency on (or a requirement for) a legacy Circuit-Switched voice network to be maintained.

The following disclosure relates to methods and apparatus for power optimization for VoLTE service utilizing discontinuous transmission (DTX). Power consumption is a challenge for wireless devices, e.g., UEs, when providing a VoLTE service. One method to reduce power consumption by a UE is to operate using a DRX mode and/or a DTX mode. In the DTX mode, the UE can turn off its transmitter and minimize functions of the receiver when there is a period of voice inactivity. A DTX mechanism uses transmission of a silence descriptor (SID) frame to optimize the power savings. A SID frame can be a SID_UPDATE frame or a SID_FIRST frame. A SID_FIRST frame can indicate the beginning of a DTX mode of operation or period. A SID_UPDATE frame can contain comfort noise (CN) parameters that convey information on the acoustic background noise. As described herein, the term "SID frame" generally refers to the functions of a SID_UPDATE frame.

A UE includes a speech codec, such as an AMR or an AMR-WB codec to convert analog speech signals into digital packets for transmission over a wireless network. A speech codec can have two states, SPEECH and SILENCE for use in a DTX mode. A state of SILENCE indicates voice inactivity, while a state of SPEECH indicates voice activity. A speech codec includes a voice activity detector (VAD) that can allow the speech codec to reduce the number of transmitted bits and packets during a silent period. In advance of a silent period of voice inactivity, the speech codec computes CN parameters that are subsequently transmitted to a receiver of an endpoint device to which the UE is connected. The operation to send CN parameters at regular intervals during silent periods is part of the DTX operation. By determining a state of voice inactivity while operating in the DTX mode, the UE transmits a SID frame to inform the receiver of the endpoint device of the voice inactivity and provides instructions to terminate most receiver functions and to generate CN in the endpoint device during the period of silence. Subsequently, the UE suspends operation of the transmitter. Thus, both the transmitting UE and the receiving endpoint device can conserve power by using the DTX mode with voice activity/inactivity detection. The use of speech inactivity detection with SID frame communication to reduce average transmission rates in a DTX mode of operation is also referred to as an SCR operation.

While in a SILENCE state, the UE transmits SID_UPDATE frames, containing CN parameters that convey information on the acoustic background noise. A SID_UPDATE frame can be sent every eight frames (160 ms) to control the operation and power consumption of the UE. The CN parameters can be based on measurements of ISF parameters or LSF parameters. When a receiver of the endpoint device receives a SID_UPDATE frame with CN parameters, the endpoint device can generate CN, to provide to the listener during the period of silence.

Embodiments disclosed herein further minimize power consumption by a UE operating in a DTX mode in a SILENCE state. A representative method utilizes the CN parameters in order to control how often to transmit SID_UPDATE frames. By utilizing the CN parameters, a decision is made whether and/or when to send a SID_UPDATE frame, while balancing any quality requirements. A comparison of the current and previous weighted averages of the CN parameters can be used by the UE to determine when to transmit SID_UPDATE frames. Specifically, a difference is determined between 1) a weighted average of one or more comfort parameters for a most recent sequence of speech frames and 2) a weighted average of one or more comfort parameters for a previous sequence of speech frames. When the difference between the weighted averages is greater than a difference threshold, a SID_UPDATE frame can be transmitted by the UE. The current weighted average of one or more CN parameters is determined by averaging over the most recent sequence of speech frames. The most recent sequence of speech frames (or more generally, a first sequence of speech frames) and a previous sequence of speech frames (or more generally, a second sequence of speech frames) can each span an identical number of consecutive speech frames. The first and second sequences of speech frames can overlap by at least one speech frame and can be offset from each other by at least one speech frame. In some embodiments, the first and second sequences of speech frames can be non-overlapping (e.g., two consecutive sequences of speech frames.) The weighted average of the CN parameters for the first sequence of speech frames can be determined by averaging over the CN parameters of the consecutive speech frames in the first sequence. The weighted average of the CN parameters for the second sequence of speech frames can be determined by averaging over the CN parameters of the consecutive speech frames in the second sequence. A speech frame can be a digitized and encoded data representation of the audio speech, e.g., an output of a speech encoder.

Increasing a time period over which averaging occurs, e.g., from eight speech frames, as defined in one or more 3GPP specifications and/or customarily used, to N*8 speech frames (or more generally to a time period longer than used for a "default" configuration or mode of operation) can further reduce power consumption at the UE. SID_UPDATE frames can be transmitted every N*8 speech frames rather than every eight frames. Furthermore, additional benefits can be realized by combining the aforementioned methods, i.e., increase the averaging period to N*8 speech frames and apply a difference threshold to determine whether to transmit a SID_UPDATE frame. This combined approach can further reduce power consumption at the UE. The method to increase the averaging period to N*8 speech frames can include communicating packets between wireless devices via a wireless network while operating in a proprietary communication mode, e.g., in a mode in which each wireless device recognizes that the other wireless device can support an extended mode in which SID_UPDATE frames are spaced further apart than a "default" setting. The wireless device determines when the second wireless device is capable of transmitting a SID_UPDATE frame using an extended time period between SID_UPDATE frames. The extended time period can be greater than eight speech frames, in some embodiments. The proprietary communication mode can be implemented as a communication mode between wireless devices that exchange directly or indirectly information about their settings and/or capabilities. In some embodiments, the extended mode can be used between two wireless devices that each include an iOS operating system. In some embodiments, the extended mode can be used between an iOS device and another iOS device. In some embodiments, the extended mode can be used between an iOS device and a device using a different operating system, e.g., an Android™ device. In some embodiments, the extended mode can be used between two devices that use the same operating system, e.g., both Android™ devices.

At a receiving endpoint device, spectral information (e.g., ISF or LSF parameters) and energy information that is received in SID_UPDATE frames can be interpolated between successive SID_UPDATE frames to determine CN parameters for CN generation. In some embodiments, an interpolation factor can be adjusted based on a length of time between successive SID_UPDATE frames, as the time between SID_UPDATE frames may not be constant. In some embodiments, when a SID_UPDATE frame is not received, a previous SID_UPDATE frame, e.g., the last received SID_UPDATE frame, can be reused for CN generation at the receiving endpoint device.

In an embodiment, a method for SID communication between two "compatible" devices that share a common capability (such as using versions of the same operating system) can be provided. In some embodiments, two iOS devices can use a particular method for SID frame generation and transmission at a transmitting device and for SID frame reception and CN generation at the receiving endpoint device. The method can be used to address compatibility issues with non-iOS devices, specifically concerning their expectation of the reception and frequency of occurrence of SID_UPDATE frames. Adaptation of an algorithm for iOS only applications can use the fact that for many iOS services, such as iMessage®, FaceTime®, etc., a device identification (ID) is stored in a central server. Prior to altering SID generation and SID_UPDATEs, an originating device can check whether a receiving endpoint device is an iOS device. The originating device can check for properties of the receiving endpoint device because, the originating device can obtain one or more IDs for the receiving endpoint device, such as MSISDN, SIP, URI, etc. When it is confirmed that both devices are iOS devices, a frequency of SID_UPDATE frame transmission can be further reduced. A compatible iOS device receiver can reuse previous SID_UPDATE frames or use extrapolation of previous SID_UPDATE frames to generate CN in the endpoint device.

DTX operational modes can allow the radio transmitter of a UE to be switched off most of the time during speech pauses to save power in the UE. A secondary benefit using DTX modes can be a reduction in the overall interference level over the radio frequency "air" interface. An DTX mechanism can include the following functions:
  a voice activity detector (VAD) on the transmit (TX) side;
  evaluation of the background acoustic noise on the transmit (TX) side, in order to transmit characteristic parameters to the receive (RX) side; and
  generation on the receive (RX) side of a similar noise, referred to as CN, during time periods when voice packet radio transmission from the TX side is switched off.

During a normal voice conversation, participants can alternatively speak such that on average each direction of transmission can be occupied about 50% of the time. As previously noted, the DTX operational mode with voice activity detection and SID frame transmission can result in a lower bit-rate than normally used for encoding speech. A wireless network can adapt its transmission scheme to take advantage of the resulting variable bit-rate, e.g., to share radio frequency resources in the access network more efficiently among multiple UEs.

CN is a synthetic background noise used in wireless communications to fill the artificial silence in a transmission resulting from voice activity detection. Some wireless systems use voice activity detection in which low speech volume levels can be ignored by a transmitting wireless device. For wireless systems, this can save bandwidth and power consumption by transmitting nothing when the source volume falls below a certain threshold, leaving only louder sounds (such as the speaker's voice) to be sent.

AMR Codecs can support a DTX operational mode that includes voice activity detection, silence description (e.g., using SID frames), and CN generation to fill speech pauses. When the speech encoder at the transmitting UE detects voice inactivity, speech frames are not transmitted in order to reduce power consumption of the UE, reduce interference on the radio interface, and reduce loading. A receiving speech decoder in a receiving endpoint device can fill speech pauses with simulated background noise, referred to as "comfort noise" (CN), to minimize the contrast between pauses and active speech. SID_UPDATE frames are regularly sent from the transmitting UE to the receiving endpoint device during voice inactivity to match the generated CN to background noise at the transmitting UE. This process can be especially important at the onset of a subsequent talk spurt, and therefore SID_UPDATE frames used for CN generation should not be too "old", when speech resumes, as the simulated background noise level provided to the user at the receiving endpoint device should be comparable to the actual background noise level that will be transmitted in the ensuing speech frames. Per one or more 3GPP specifications, a radio subsystem of the UE can use a fixed timing for the transmission of SID_UPDATE frames. In particular, one or more 3GPP specifications require that SID_UPDATE frames can be transmitted during speech pauses during regular intervals, e.g., every eight frames or 160 ms.

The embodiments disclosed herein characterize the voice inactivity periods and provide for transmitting SID_UPDATE frames using in time intervals spaced further apart than every eight frames, while maintaining an acceptable quality of service. A longer time interval for SID_UPDATE frame transmission can reduce power consumption inasmuch as the transmitter of the UE can be inactive while the receiver at the receiving endpoint device (e.g., another UE) can remain in a monitoring mode for longer periods of time. Methods and apparatus for embodiment of the present invention are discussed below with reference to the Figures. However, those skilled in the art will readily appreciate that the detailed description given herein with respect to these Figures is for explanatory purposes only and should not be construed as limiting.

FIG. 1 illustrates a representative Long Term Evolution (LTE) wireless network 100, e.g., as specified by 3GPP, that can include user equipment (UE) 102 connected by one or more radio links 126 to one or more radio sectors 104 provided by an evolved radio access network 122. Each radio sector 104 can represent a geographic area of radio coverage emanating from an associated evolved Node B (eNodeB) 110 using a radio frequency channel operating at a selected frequency. In some embodiments, radio sectors 104 can also be referred to as cells. Each eNodeB 110 can generate one or more radio sectors 104 to which the UE 102 can connect by one or more radio links 126. In some embodiments of an LTE wireless network 100, the UE 102 can be connected to more than one radio sector 104 simultaneously. The multiple radio sectors 104, to which the UE 102 can be connected, can emanate from a single eNodeB 110 or from separate eNodeB's 110. A group of eNodeB's 110 can be referred to as an evolved Universal Mobile Telecommunications System (UMTS) radio access network (eUTRAN) 106. Typically, each eNodeB 110 in an eUTRAN 106 can include a set of radio frequency transmitting and receiving equipment mounted on an antenna tower and a radio controller for controlling and processing transmitted and received radio frequency signals. The eNodeB 110 of the eUTRAN 106 can manage the establishment, maintenance and release of the radio links 126 that connect the UE 102 to an evolved radio access network 122. In some embodiments, the eNodeB 110 can provide access to a wireless network based on an LTE technology, such as an LTE wireless network and/or LTE-Advanced (LTE-A) wireless network. It will be appreciated, however, that various example embodiments are not limited to application in LTE wireless network systems.

Radio resources that form the radio links 126 in the radio sectors 104 can be shared among multiple UEs 102 using a number of different multiplexing techniques, including time division, frequency division, code division, space division and combinations thereof. A radio resource control (RRC) signaling connection can be used to communicate between the UE 102 and the eNodeB 110 in the eUTRAN 106 of the evolved radio access network 122 including requests for and dynamic allocations of radio resources to multiple UEs 102. The UE 102 can be connected to the evolved radio access network 122 through one or more radio sectors 104 simultaneously.

The evolved radio access network 122, which provides radio frequency air link connections to the UE 102, connects also to an evolved packet core network 120. The LTE wireless network 100 can be designed to operate as a packet switched network exclusively. The evolved packet core network 120 can include serving gateways 112 that interconnect the evolved radio access network 122 to public data network (PDN) gateways 116 that connect to external internet protocol (IP) networks 118. The eNodeB's 110 can also be connected to a mobility management entity (MME) 114 that can provide control over connections for the user equipment 102. The eNodeB 110 can control allocation of radio resources for the radio links 126 to the user equipment 102. The eNodeB 110 can communicate paging messages to the user equipment 102, including paging messages to establish an RRC connection with the UE 102 and to transition the UE 102 from an RRC idle state to an RRC connected state. The eNodeB 110 can schedule radio resources for the UE 102 and provide indications of radio resource allocations using signaling messages communicated in a physical downlink control channel (PDCCH). The UE 102 can monitor the PDCCH to determine when radio resources are assigned to the particular UE 102 for downlink transmission from the eNodeB 110 or for uplink transmission to the eNodeB 110. The eNodeB 110 can also broadcast System Information Block (SIB) messages periodically to inform the UE 102 about properties of the radio sectors 104 and/or for services provided by the eNodeB 110. The Mobility Management Entity (MME) 114 in the Evolved Packet Core Network 120 can be a key control node for the LTE access network and can be responsible for tracking and paging UE's 102 when in an idle mode.

LTE wireless network 100 can support VoLTE service using a VoIP specific protocol stack with signaling radio bearers and speech radio bearers. A VoLTE service requires capabilities at both the end-user device (e.g., UE 102) and the LTE wireless network 100. To provide VoIP service, the UE 102 and includes a speech codec that can periodically generate blocks of data. There is a wide range of speech codecs available, but it may be assumed that the UE 102 and the LTE network 100 can support an AMR speech codec that provides a full set of modes, e.g., eight different bit rates. The UE 102, in some embodiments, can include support for an AMR wideband codec (WB-AMR) that provides additional modes. The AMR speech coder can operate as a narrowband or a wideband speech codec. Both AMR and WB-AMR codecs use a 20 msec. frame structure. The AMR speech codec includes a multi-rate speech coder, a source controlled rate (SCR) operation using including a voice activity detector and a CN generation system, and an error concealment mechanism to combat the effects of transmission errors and lost packets.

The following terms and definitions are used in this specification:

AMR: Adaptive Multi-Rate.

AMR-WB: Adaptive Multi-Rate Wideband.

Accepted SID frame: traffic frame which is flagged with SID="1" or SID="2".

Bad traffic frame: traffic frame flagged BFI flag="1" (Bad Frame Indication).

CN: comfort noise. Frame: time interval of 20 msec. corresponding to a time segmentation of the AMR speech encoder; also used as a short term for a traffic frame.

Frame: time interval of 20 msec. corresponding to the time segmentation of the full rate speech encoder, also used as a short term for a traffic frame.

Good speech frame: good traffic frame which is not an accepted SID frame.

Good traffic frame: traffic frame flagged BFI flag="0".

IFS: Immittance Spectral Frequency.

Invalid SID frame: accepted SID frame which was not classified as valid SID frame. This frame is not valid for updating CN parameters, but the frame conveys information that CN generations should be started or continued.

LSF: Line Spectral Frequency

LSP: Line Spectral Pair.

LPC—linear predictive coding; interpolation of the CN parameters values received in previous (e.g., the last two) valid SID frames.

Lost SID frame: unusable frame received when the RX DTX handler is generating CN and a SID frame is expected (Time Alignment Flag, TAF="1").

Lost speech frame: unusable frame received when the RX DTX handler is passing on traffic frames directly to a speech decoder.

$N_{elapsed}$: Number of elapsed frames since the last updated SID frame.

R0: Frame energy value/interpolation of the CN parameters values received in the last two valid SID frames.

RSS: Radio Subsystem

RX_TYPE: Classification of the received traffic frame.

SCR: Source Controlled Rate operation

SID (silence descriptor) frame: CN frames. It can convey information on the acoustic background noise and/or inform the decoder that it should start generating background noise. SID frame is characterized by a SID code word.

SID_FIRST: AMR or AMR-WB frame used to indicate the beginning of a DTX period (SP=0).

SID_UPDATE: AMR or AMR-WB frame used to convey comfort noise characteristics during a DTX period (SP=0).

SID code word: fixed bit pattern for labelling a traffic frame as a SID frame.

SID field: bit positions of the SID code word within a SID frame.

SP flag: Boolean flag, generated by the TX DTX handler, indicating the presence of a speech frame ("1") or the presence of a SID frame ("0").

Speech frame: traffic frame that cannot be classified as a SID frame.

TAF flag: Time Alignment Flag. Boolean flag that marks with TAF=1 traffic frames that are aligned with the Slow Associated Control Channel (SACCH) multi-frame structure. The next SID frame is expected at the decoder when TAF=1.

Traffic frame: block of 244 information bits transmitted on the Enhanced Full Rate speech traffic channel. A traffic frame can be a speech frame or a SID frame.

TX_TYPE: Classification of the transmitted traffic frame.

Unusable frame: bad traffic frame that is not an accepted SID frame.

VAD: voice activity detector.

VAD flag: Voice Activity Detection flag. Boolean flag generated by a VAD algorithm indicating the presence ("1") or the absence ("0") of a speech frame.

Valid SID frame: good traffic frame flagged with SID="2". This frame is valid for updating CN parameters at any time.

Figure 2A:
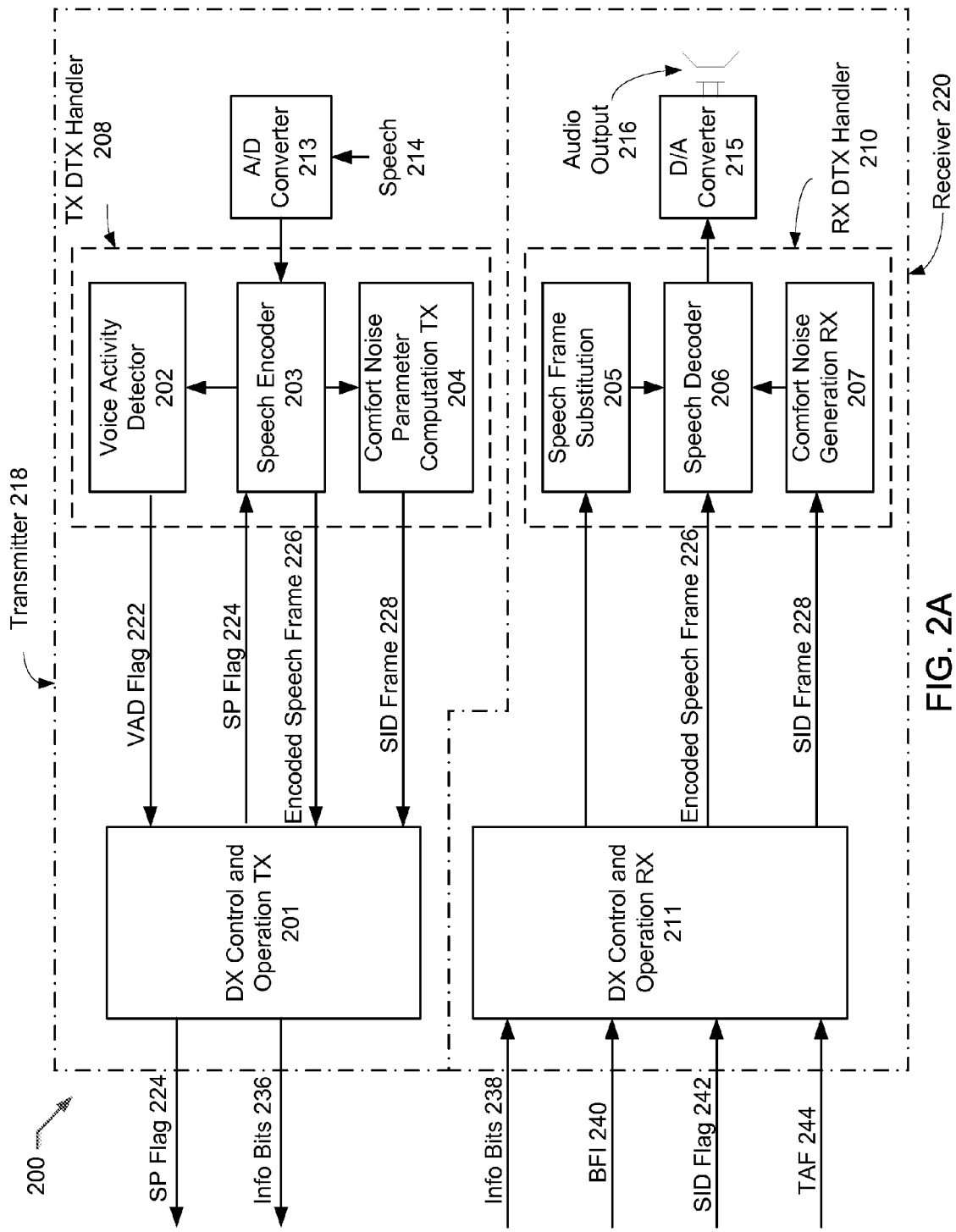
FIG. 2A illustrates audio processing functions and an AMR or an AMR-WB codec as utilized in UMTS and LTE wireless communication systems, in accordance with some embodiments.

FIG. 2A illustrates an encoder/decoder (codec) 200 including audio processing functions and AMR or AMR-WB speech encoding and decoding functions that can be utilized in LTE wireless communication systems. Codec 200 includes processing elements to perform functions of a multi-rate speech encoder and decoder, a DTX mechanism to detect voice activity and generate CN, and an error concealment mechanism to combat the effects of transmission errors and lost packets. As shown on FIG. 2A, codec 200 includes voice activity detector 202 (VAD 202), speech encoder 203, comfort noise parameter computation TX 204, and DX control and operation TX 201 in a transmitter 218. Codec 200 also includes speech frame substitution 205, speech decoder 206, comfort noise generation RX 207, and DX control and operation RX 211 in a receiver 220. Comfort noise parameter computation TX 204 computes CN parameters in the transmitter 218, while comfort noise generation RX 207 generates CN based on received CN parameters in the receiver 220. The combination of the VAD 202, speech encoder 203, and comfort noise parameter computation TX 204 is referred to as the TX DTX handler 208. The combination of the speech frame substitution 205, speech decoder 206, and comfort noise generation RX 207 is referred to as the RX DTX handler 210. DX control and operation TX 201 and DX control and operation RX 211 provide functionality to support the DTX mechanism at the transmitter 218 and the receiver 220 respectively. The Transmitter 218 includes DX control and operation TX 201, TX DTX handler 208, and analog-to-digital (A/D) converter 213. The Receiver 220 includes DX control and operation RX 211, RX DTX handler 210, and digital-to-analog (D/A) converter 215. In FIG. 2A, audio processing elements such as the A/D converter 213 and the D/A converter 215 are included to show a complete speech path between an audio input and an audio output of the UE 102.

As previously described herein, codec 200 can be an AMR codec or an AMR-WB codec. The AMR codec is a single integrated speech codec with eight source rates from 4.75 kbit/s to 12.2 kbit/s, and a low rate background noise encoding mode. The AMR-WB codec is a single integrated speech codec with nine source rates from 6.60 kbit/s to 23.85 kbit/s, and a low rate background noise encoding mode. The AMR and AMR-WB codecs can be capable of switching their bit rates every 20 ms speech frame.

The signals shown in FIG. 2A include the following:
1) Speech 214—input to transmitter 218.
2) Audio Output 216—output from receiver 220.
3) Voice Activity Detector (VAD) flag 222.
4) Encoded speech frame 226.
5) Silence Descriptor (SID) frame 228.
6) SP Flag 224, TX_TYPE, 3 bits, indicates whether information bits are available and if they are speech or SID information.
7) Information bits (Info Bits) 236 delivered to the wireless network.
8) Information bits (Info Bits) 238 received from the wireless network.
9) Bad Frame Indicator (BFI) 240, RX_TYPE, the type of frame received quantized into three bits.
10) Silence Descriptor (SID) flag 242.
11) Time Alignment Flag (TAF) 244 marks the position of the SID frame within the SACCH (Slow Associated Dedicated Control Channel) multi-frame.

Figure 3:
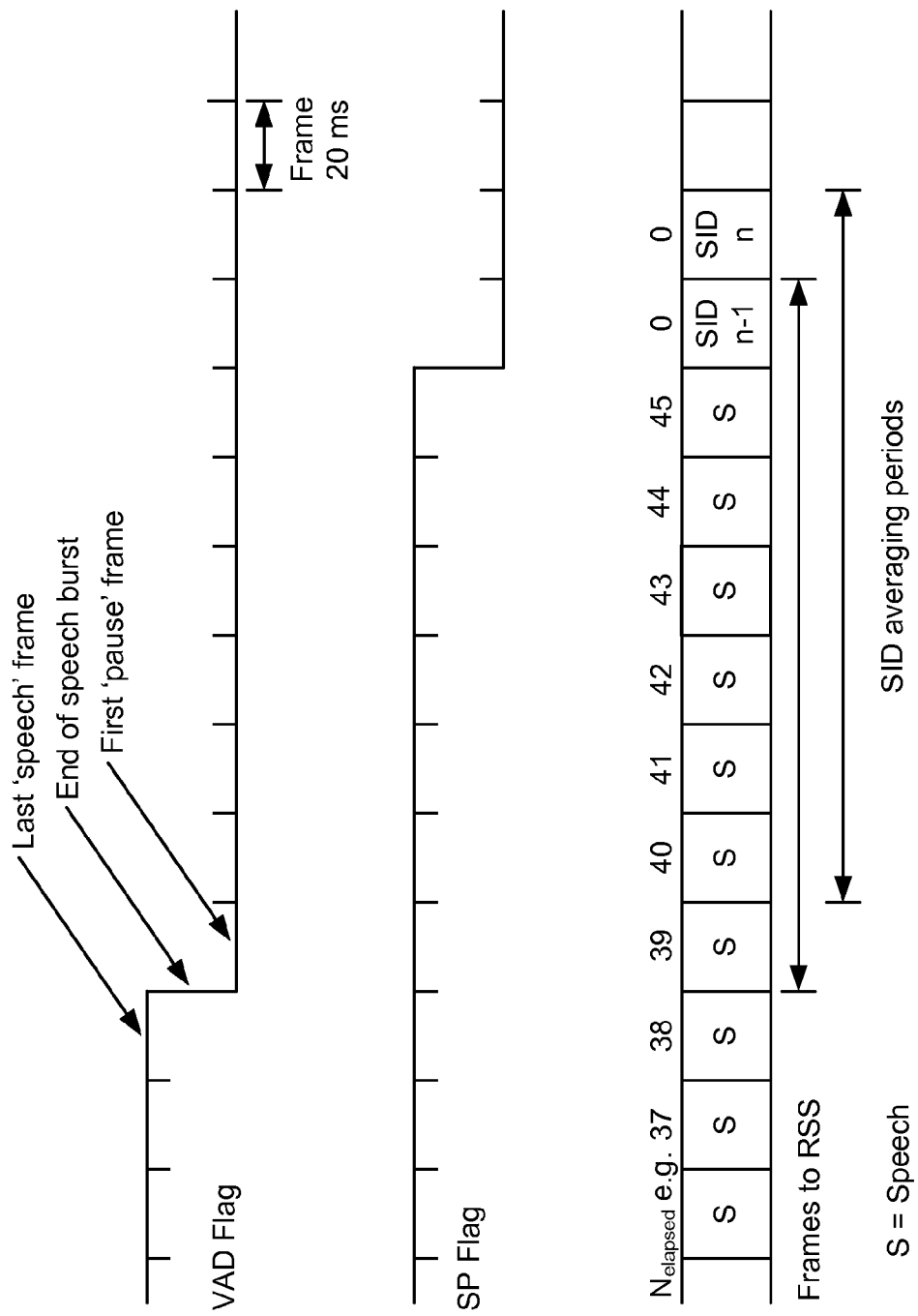
FIG. 3 illustrates timing of a silence indicator (SID) averaging procedure for a DTX mode of operation.

FIG. 2B illustrates Table 1 listing a set of TX_TYPE identifiers. FIG. 2C illustrates Table 2 listing a set of RX_TYPE identifiers. The TX_TYPE identifiers and RX_TYPE identifiers can apply to a DTX mode of operation. FIG. 3 illustrates timing of a silence indicator (SID) averaging procedure for a DTX mode of operation. FIGS. 2B, 2C and 3 are representative of SID averaging as defined in one or more 3GPP specifications.

In reference to FIG. 2A and FIG. 3 the following functions can be used as part of a DTX mode of operation: (1) the voice activity detector (VAD 202) on the TX side; (2) evaluation of the background acoustic noise on the TX side (comfort noise parameter computation TX 204), in order to transmit characteristic parameters to the RX side; (3) generation of CN on the RX side during periods when no normal speech frames are received (comfort noise generation RX 207). A silence descriptor (SID) frame can be sent at regular intervals and can provide CN parameter information to the RX side. The SID frame 228 is indicated in FIG. 2A.

The VAD 202 determines voice activity (and voice inactivity). The input to the VAD 202 can be a digitized and encoded version of Speech 214 together with a set of parameters computed by the speech encoder 203. The VAD 202 can use this information to decide whether each 20 ms speech coder frame contains a signal that should be transmitted. The output of the VAD 202 is a Boolean flag, namely VAD Flag 222 indicating the presence of such signals. The VAD 202 can use parameters of the speech encoder 203 to compute the VAD Flag. A background noise level can be estimated in one or more frequency bands. An intermediate VAD decision can be calculated by comparing an input signal-to-noise ratio (SNR) to an adaptive SNR threshold. The SNR threshold is adapted based on measured noise levels and on long-term speech estimates.

TX side Functions: In TX DTX handler 208, the comfort noise parameter computation TX 204 includes an evaluation algorithm for an AMR or an AMR-WB speech codec:

For an AMR codec, the CN evaluation algorithm can use unquantized Linear Prediction (LP) parameters, using a Line Spectral Pair (LSP) representation. The CN evaluation algorithm can compute the following CN parameters to assist in CN generation:
1. Weighted average LSF parameter vector (e.g., a weighted average of LSF parameters of the eight most recent frames);
2. Weighted average logarithmic frame energy parameters (e.g., a weighted average of logarithmic frame energy parameters of the eight most recent frames).

For an AMR-WB codec, the CN evaluation algorithm can use unquantized LP parameters, using an ISF representation. The CN evaluation algorithm can compute the following CN parameters to assist in CN generation:
1. Weighted average ISF parameter vector (e.g., a weighted average of ISF parameters of the eight most recent frames);
2. Weighted average logarithmic frame energy parameters (e.g., a weighted average of logarithmic frame energy parameters of the eight most recent frames).

These CN parameters can provide information about an energy level (averaged logarithmic frame energy) and a spectrum (ISF or LSF parameter vector) representation of the background noise. As previously described herein, the CN parameters can be encoded into a SID frame for transmission to the RX side. In some embodiments described herein, the averaging period can be based on more than eight speech frames.

FIG. 3 illustrates timing for a SID frame averaging procedure for a DTX mode of operation. The VAD flag is a Boolean flag, generated by a VAD algorithm, which indicates the presence ("1") or the absence ("0") of a speech frame. The SP flag is a Boolean flag, generated by the TX DTX handler, which indicates the presence of a speech frame ("1") or the presence of a SID frame ("0"). The first SID frame after a period of active speech can also serve to initiate CN generation on the receive side, as the first SID frame is always sent at the end of a speech burst, i.e., before transmission terminates. Also, the CN parameters to be encoded into a SID frame can be calculated over eight consecutive frames marked with VAD=0. Prior to averaging the ISF (or LSF) parameters over the CN averaging period, a median replacement can be performed on the set of ISF (or LSF) parameters to be averaged to remove parameters that are not characteristic of the background noise on the transmit side.

RX side Functions: RX DTX handler 210 can perform speech decoding, CN computation, and SID frame detection. Whenever a good speech frame is detected by the RX DTX handler 210, the good speech frame can pass directly to speech decoder 206. Whenever a lost speech frame or lost SID frames are detected, a substitution or mutation can be applied. A valid SID frame can result in CN generation.

In general, the CN generation can be started or updated whenever a valid SID frame is received. When speech frames are received by the decoder, the LP parameters and the energy parameters of the last seven speech frames can be kept in memory. The decoder can count the number of frames that elapse after the last SID frame is updated.

As soon as a SID frame is received, CN can be generated at the decoder. Initial SID frame parameters for a "silent" period are computed from CN parameters stored during frames 39-45, as illustrated in FIG. 3. The averaging procedure for obtaining the CN parameters for the first SID frame can be as follows: (1) when a speech frame is received, the ISF or LSF parameter vectors can be decoded and stored in memory; moreover, the logarithmic frame energy of the decoded signal can also be stored in memory; (2) averaged values of the quantized ISF (or LSF) parameter vectors and the averaged logarithmic frame energy of the decoded frames can be computed and used for CN generation. In some embodiments, CN parameters from a previous SID_UPDATE frame can be used.

FIG. 3 also illustrates timing of a SID frame as part of a DTX mode of operation. As shown in FIG. 2A, the transmit TX DTX handler 208 includes VAD 202, Speech encoder 203, and comfort noise parameter computation TX 204. The TX DTX handler 208 continuously passes traffic frames, individually marked by an SP flag. This binary flag is redundant to the SID code word labelling. SP flag="1" indicates a speech frame, and SP flag="0" indicates a SID frame. The scheduling of the frames for transmission on the radio frequency air interface of the UE 102 can be based on values of the SP flag.

To allow verification of the TX DTX handler 208 functions, all frames before a reset of the system can be treated as if there were speech frames of an infinitely long time. Therefore, and in order to ensure the correct estimation of CN parameters at the receiver side, the first seven frames after a reset, or after enabling the DTX mode of operation, can always be marked with SP flag="1" (TX_TYPE="SPEECH_GOOD"), even if VAD flag="0".

VAD 202 operates continuously to assess whether the input signal contains speech or not. The output of VAD 202 is a binary-valued VAD flag (VAD flag="1" or VAD flag="0", respectively) on a frame-by-frame basis. The VAD flag controls indirectly, via the TX DTX handler 208 operations, the overall DTX mode of operation on the transmitter side. Whenever VAD flag="1", the speech frame output from the speech encoder 203 along with mode information can be transmitted, marked with SP flag="1" (TX_TYPE="SPEECH_GOOD").

At the end of a speech burst (e.g., during a transition from VAD flag="1" to VAD flag="0"), it takes eight consecutive frames to make a new updated SID frame analysis available at the receiver side. Normally, the first seven speech frames output from the speech encoder 203 after the end of a speech burst can be transmitted, marked with SP flag="1" (TX_TYPE="SPEECH_GOOD"). The end of a speech burst is then indicated by passing the eighth frame after the end of the speech burst marked with SP flag="0". FIG. 3 illustrates an eight-frame SID averaging period, over which the CN parameters are averaged, in particular the R0 (frame energy value) and LPC coefficients are averaged during the eight-frame SID averaging period. Updating of the CN parameters, namely the frame energy and LPC coefficients, can occur each time a valid SID frame is received at the receiver. As part of the updating the CN parameters can be interpolated over a SID update period to obtain smooth transitions between different time periods having different amounts of background noise (and/or between speech bursts and silent periods).

Figure 4A:
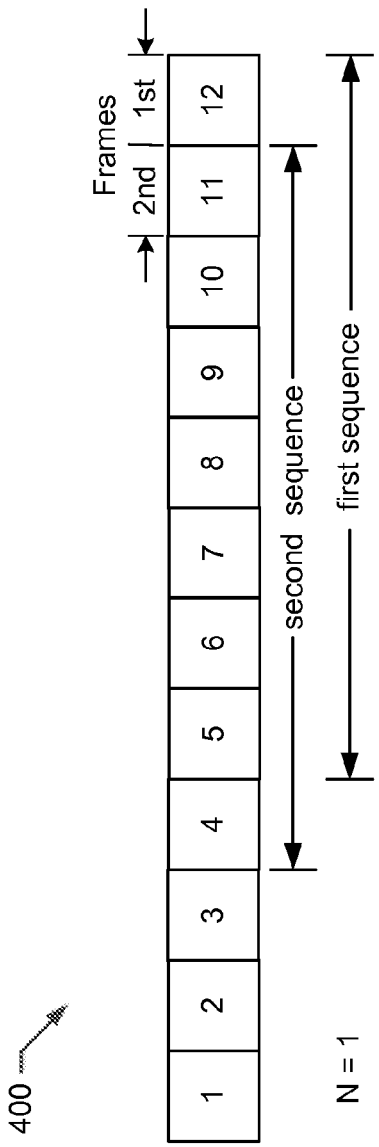
FIGS. 4A and 4B illustrate timing of sequences of frames received at a UE, in accordance with some embodiments.

FIG. 4A illustrates a diagram 400 of timing for sequences of frames received at the UE 102, in accordance with some embodiments. The sequences of frames shown include twelve successive frames. A "second" (or more generally a previous) frame is labeled as frame 11, and a "first" (or more generally a current) frame is labeled as frame 12. Frames 4 to 11 can be referred to as a "second" sequence of frames, while frames 5 to 12 can be referred to as a "first" sequence of frames. Hence, the first sequence of frames is a sequence of frames including the first frame as the most recent frame, while the second sequence of frames includes the second frame as its most recent frame. The first and second sequences of frames can overlap by at least one frame. In the representative sequences illustrated in FIG. 4A, the two sequences of frames overlap by seven frames. For the representative sequence of frames shown in FIG. 4A, the first sequence of frames and the second sequence of frames each span a length of eight frames. Hence, N=1. The first sequence of speech frames and the second sequence of speech frames can each span eight consecutive speech frames. A time interval between successively transmitted SID_UPDATE frames can equal or exceed a time span of eight successive speech frames. The term "first sequence of frames" can also be referred to as the "first sequence". The term "second sequence of frames" can also be referred to as the "second sequence". The terms "sequence of frames", "sequence of speech frames" and "sequence of encoded speech frames" are equivalent terms. This nomenclature also applies to FIG. 3.

Figure 4B:
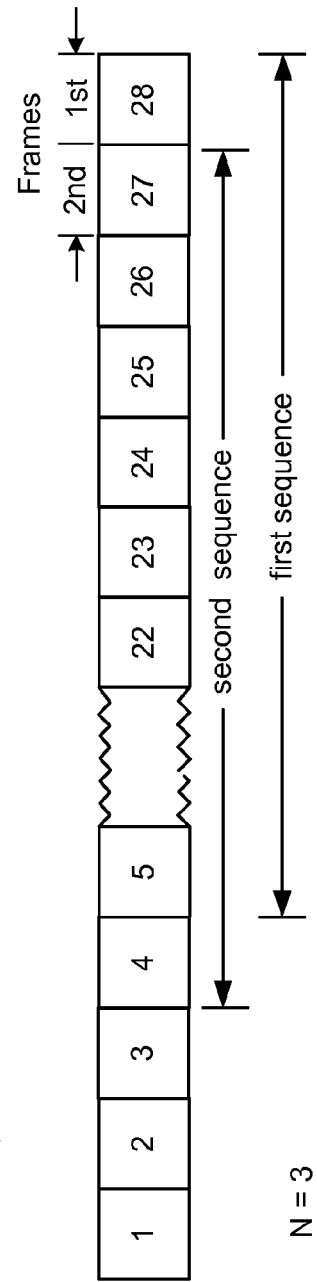

FIG. 4B illustrates a diagram 450 of timing for additional sequences of frames received at the UE 102, in accordance with some embodiments. The sequences of frames shown in FIG. 4B span 28 frames. For the representative sequences illustrates in FIG. 4B, the "second" frame is labeled as frame 27, while the "first" frame is labeled as frame 28. Therefore, frames 4 to 27 can be referred to as the second sequence of frames, and frames 5 to 28 can be referred to as the first sequence of frames. The first and second sequences can each include an integer multiple of eight frames, e.g., N*8 speech frames, where N=3. (More generally, each sequence can span an identical number of frames.) The time period separating successively transmitted SID_UPDATE frames can equal a time period of N*8 successive speech frames, where N is an integer greater than one.

In some embodiments, the first sequence of speech frames includes the first speech frame as a most recent speech frame in the first sequence of speech frames, and the second sequence of speech frames includes a second speech frame as the most recent speech frame in the second sequence of speech frames. The first sequence of speech frames and the second sequence of speech frames each (a) span an identical number of consecutive speech frames, (b) overlap by at least one speech frame and (c) are offset from each other by at least one speech frame. In FIG. 4A, the first and second sequences of speech frames each span eight consecutive speech frames, overlap by one speech frame and are offset from each other by one speech frame. For FIG. 4B, the first and second sequences of speech frames each span 24 consecutive speech frames, overlap by one speech frame and are offset from each other by one speech frame. For the embodiments illustrated in FIG. 4A and FIG. 4B, the first and second sequences of frames can also be referred to as an "$n^{th}$" and an "$(n-1)^{th}$" sequence of speech frames, respectively. And the first and second speech frames can be referred to as the $n^{th}$ and the $(n-1)^{th}$ speech frames respectively.

Figure 5A:
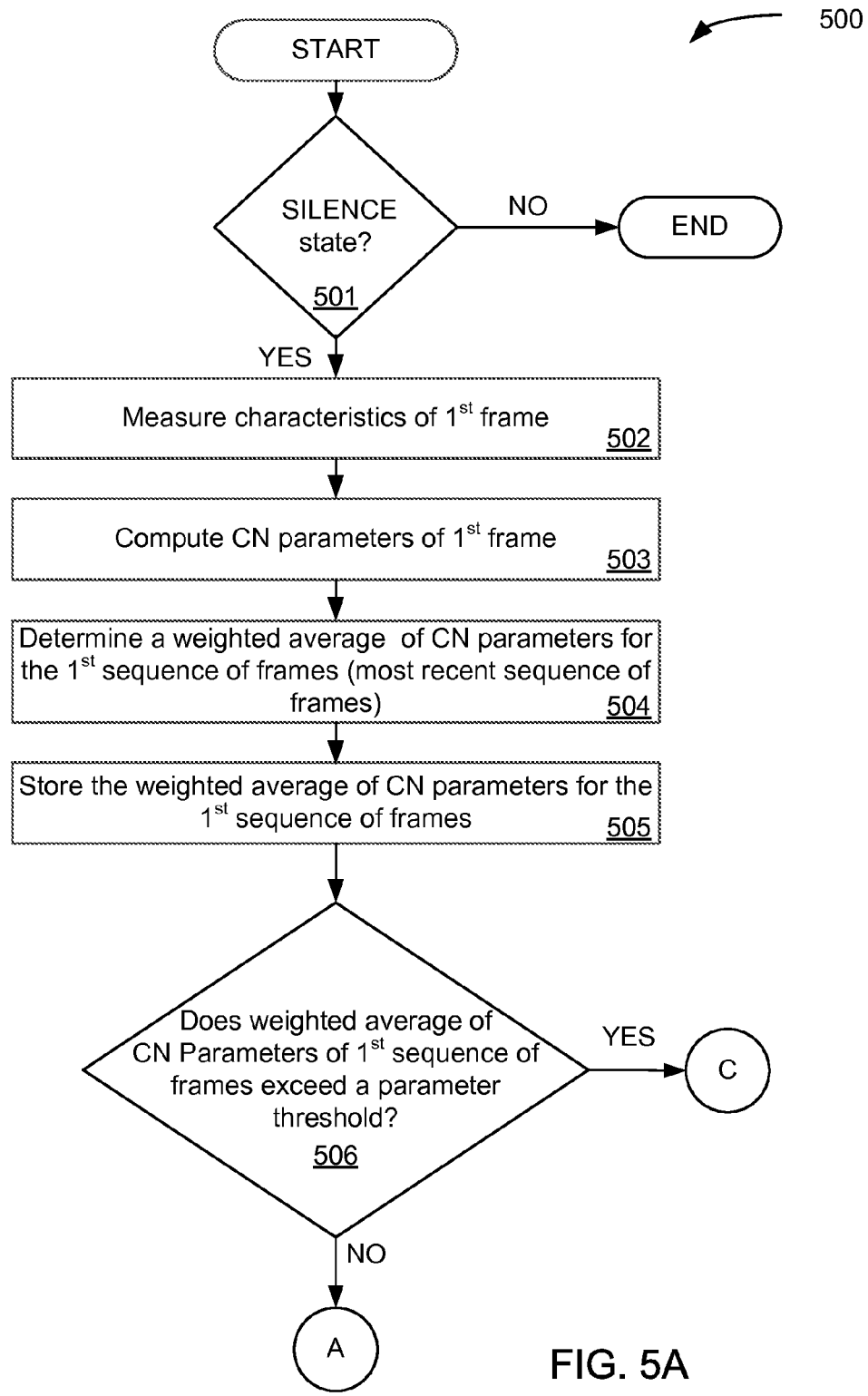
FIGS. 5A, 5B, and 5C illustrate flowcharts for determining SID_UPDATE frames in a DTX mode of operation, in accordance with some embodiments.
Figure 5B:
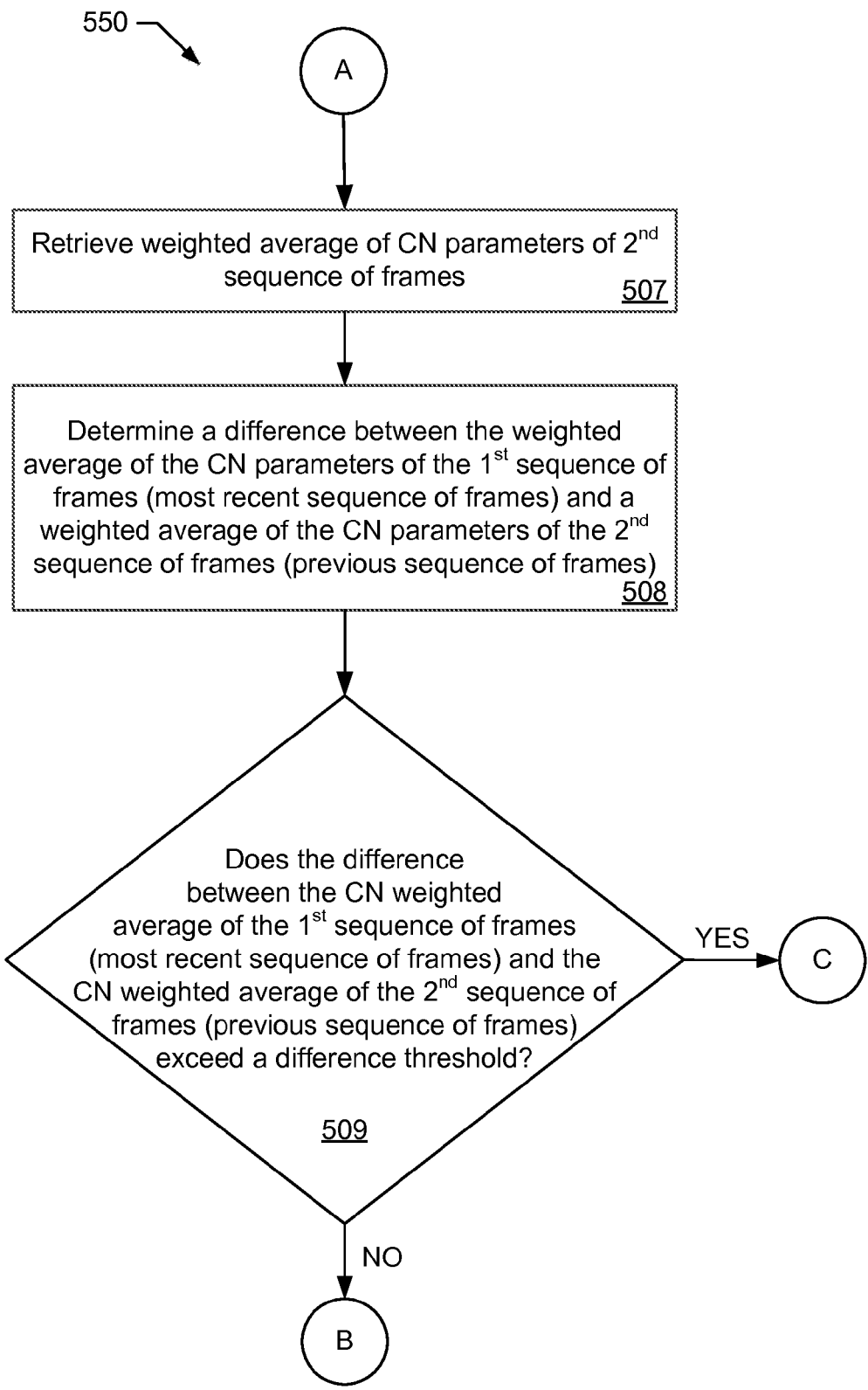
Figure 5C:
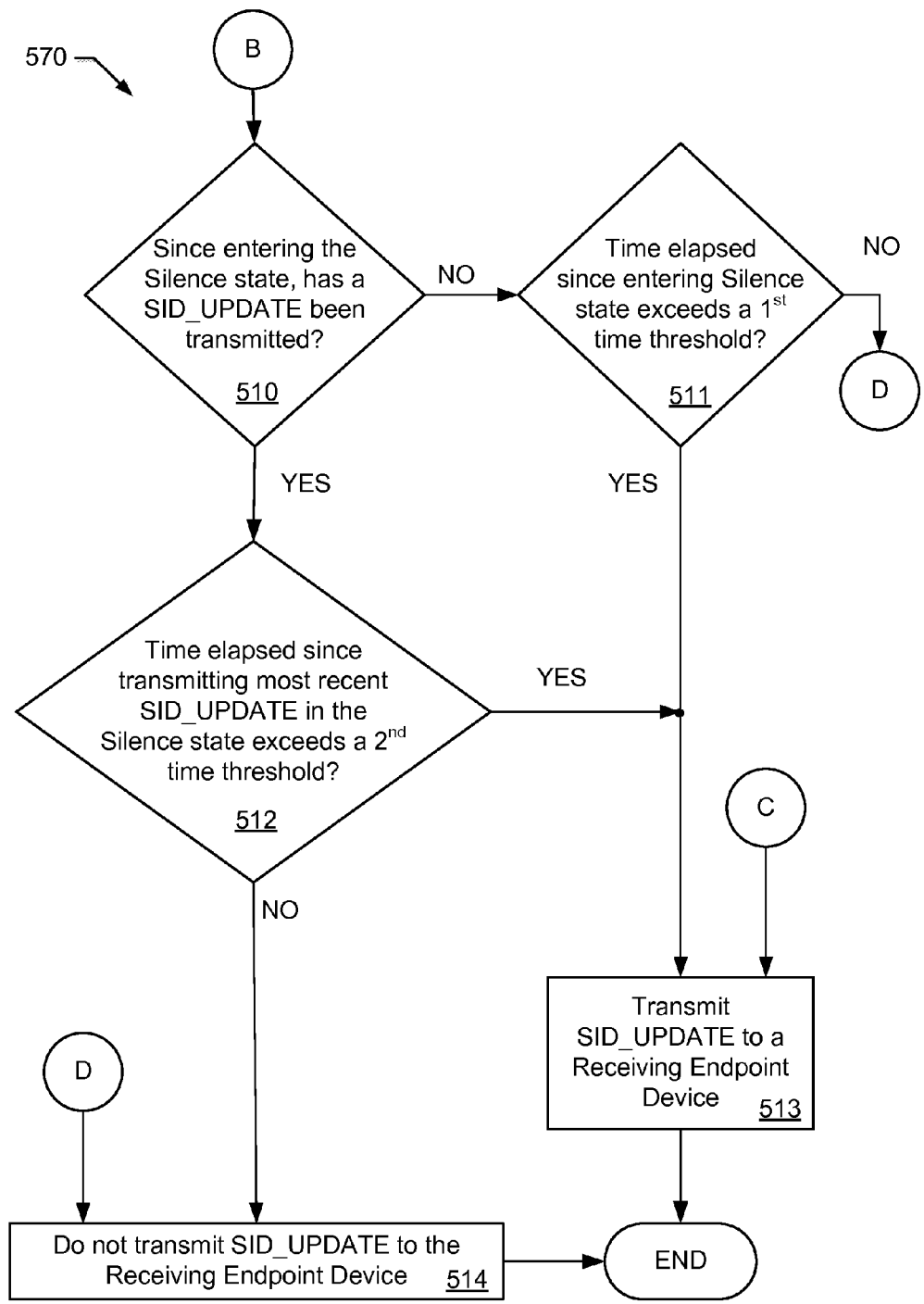

FIGS. 5A, 5B, and 5C illustrate a representative embodiment of a method to determine the transmission of SID_UPDATE frames in a DTX mode of operation. FIGS. 5A, 5B, and 5C illustrate flowcharts 500, 550, and 570 for adapting time intervals between SID_UPDATE frames at the UE 102, in accordance with some embodiments. Flowcharts 500, 550, and 570 include steps for methods in which the UE 102 determines whether a SID_UPDATE frame should be transmitted. The method includes one or more of the following steps to determine whether a SID_UPDATE frame should be transmitted.

(a) Determining a difference between (i) a weighted average of one or more CN parameters for a most recent sequence of frames and (ii) a weighted average of one or more CN parameters for a previous sequence of frames. When the difference between the weighted averages of CN parameters exceeds a difference threshold, the UE 102 transmits a SID_UPDATE frame.

(b) Determining whether the weighted average of the one or more CN parameters for the most recent sequence of frames exceeds a parameter threshold. If yes, the UE 102 transmits a SID_UPDATE frame.

(c) Determining after entering the Silence state whether a time elapsed until a first SID_UPDATE frame is transmitted or a time between SID_UDATE frames exceeds a time threshold. (i) When a first SID_UPDATE frame has not been transmitted, after entering the Silence state, the method determines whether the time elapsed since entering the Silence state exceeds a first time threshold. When the time elapsed since entering the Silence state exceeds the first time threshold, the UE 102 transmits a SID_UPDATE frame. When the time elapsed since entering the Silence state does not exceed a first time threshold, the UE 102 does not transmit a SID_UPDATE frame. (ii) When a first SID_UPDATE frame has been transmitted, the method determines whether the time elapsed since transmitting the most recent SID_UPDATE frame, while in the Silence state, exceeds a second time threshold. When the time elapsed since transmitting the most recent SID_UPDATE frame, while in the Silence state, exceeds a second time threshold, the UE 102 transmits a SID_UPDATE frame. When the time elapsed since transmitting the most recent SID_UPDATE frame, while in the Silence state, does not exceed a second time threshold, the UE 102 does not transmit a SID_UPDATE frame.

In some embodiments, the steps for item (b) or item (c) can be optional. In some embodiments, one or more of the steps (a), (b), and (c) can be used alone or in combination as a set of conditional tests to determine whether to send a SID_UPDATE frame while in the Silence state.

The following steps can be performed at the UE 102 in a representative method as illustrated in flowcharts 500, 550, and 570.

Step 501: Is a SILENCE state detected? If yes, proceed to step 502. If no, the method ends.

Step 502: Measure one or more characteristics of a first speech frame received by the UE 102.

Step 503: Compute one or more CN parameters based on one or more characteristics of the first speech frame. For an AMR codec, the CN parameters can be based on a set of weighted, averaged LSF parameter vectors and a set of averaged logarithmic frame energy parameters.

For an AMR-WB codec, the CN parameters can be based on a set of weighted, averaged ISF parameter vectors and a set of averaged logarithmic frame energy parameters.

Step 504: Determine a weighted average of CN parameters of the first sequence of speech frames, where the first sequence of speech frames is the most recent sequence of speech frames, and the first speech frame is the most recent frame in the first sequence of speech frames.

Step 505: Store the weighted average of CN parameters of the first sequence of speech frames.

Step 506: Does the weighted average of the CN parameters of the first sequence of speech frames exceed a parameter threshold? If yes, proceed to step 513, if no, proceed to step 507.

Step 507: Retrieve from storage a weighted average of CN parameters of a second sequence of speech frames, where the second speech frame is the most recent frame in the second sequence of speech frames.

Step 508: Determine a difference between the weighted average of CN parameters of the first sequence of speech frames (most recent sequences of frames) and the weighted average of the CN parameters of the second sequence of speech frames (previous sequence of frames).

Step 509: Does the difference between the CN weighted average of the first sequence (most recent sequence of speech frames) and the CN weighted average of the second sequence (previous sequence of speech frames) exceed a difference threshold? If yes, proceed to step 513, if no, proceed to step 510.

Step 510: Since entering the Silence state, has a SID_UPDATE frame been transmitted? If yes, proceed to step 512. If no, proceed to step 511.

Step 511: Does the time since entering the Silence state exceed a first time threshold? If yes, proceed to step 513. If no, proceed to step 514.

Step 512: Does the time elapsed since transmitting the most recent SID_UPDATE frame exceed a second time threshold? If yes, proceed to step 513. If no, proceed to step 514.

Step 513: Transmit a SID_UPDATE frame to a receiving endpoint device.

Step 514: Do not transmit a SID_UPDATE frame to the receiving endpoint device.

In some embodiments, steps 506 and 510-512 can be optional steps. In some embodiments, one or more of the conditional tests illustrated in steps 506, 509, and 510-512 can be used alone or in combination to determine whether to send a SID_UPDATE frame. Thus, the method illustrated can include one or more tests for a parameter threshold, a difference threshold, and/or time thresholds.

In some embodiments, step 509 is executed as follows: For an AMR codec, the SID_UPDATE frame is not transmitted to the receiving endpoint device when a difference between the weighted average of the CN parameters, which include the LSF parameter vectors, for the first and second sequences is less than an LSF threshold. Conversely, when the difference between the weighted average of the CN parameters, which include the LSF parameter vectors, for the first and second sequences equals or exceeds the LSF threshold, the SID_UPDATE frame is transmitted. Similarly, for an AMR-WB codec, the SID_UPDATE frame is not transmitted to the receiving endpoint device when a difference between the weighted average of the CN parameters, which include the ISF parameter vectors, for the first and second sequences is less than an ISF threshold. Conversely, when the difference between the weighted average of the CN parameters, which include the ISF parameter vectors, for the first and second sequences equals or exceeds the ISF threshold, the SID_UPDATE frame is transmitted. In some embodiments, a comparison of logarithmic frame energy parameters can be used in place of or in addition to LSF/ISF parameter vectors to determine whether to send the SID_UPDATE frame to the receiving endpoint device, e.g., by comparing logarithmic frame energy parameter values (or averaged values) to an energy threshold.

The method illustrated in FIGS. 5A, 5B, and 5C can allow for SID frames to be transmitted spaced apart by different time intervals based on the comparison of the weighted averages to a difference threshold, a parameter threshold, and/or time thresholds. One or more 3GPP specifications presently require SID_UPDATE frames to be transmitted every eight frames or equivalently every 160 msec (for 20 msec frames). With the method illustrated in FIGS. 5A, 5B, and 5C, the time interval between SID_UPDATE frame transmissions can be equal to or greater than eight frames. By transmitting SID_UPDATE frames less often, the UE's power consumption can be reduced.

Figure 6A:
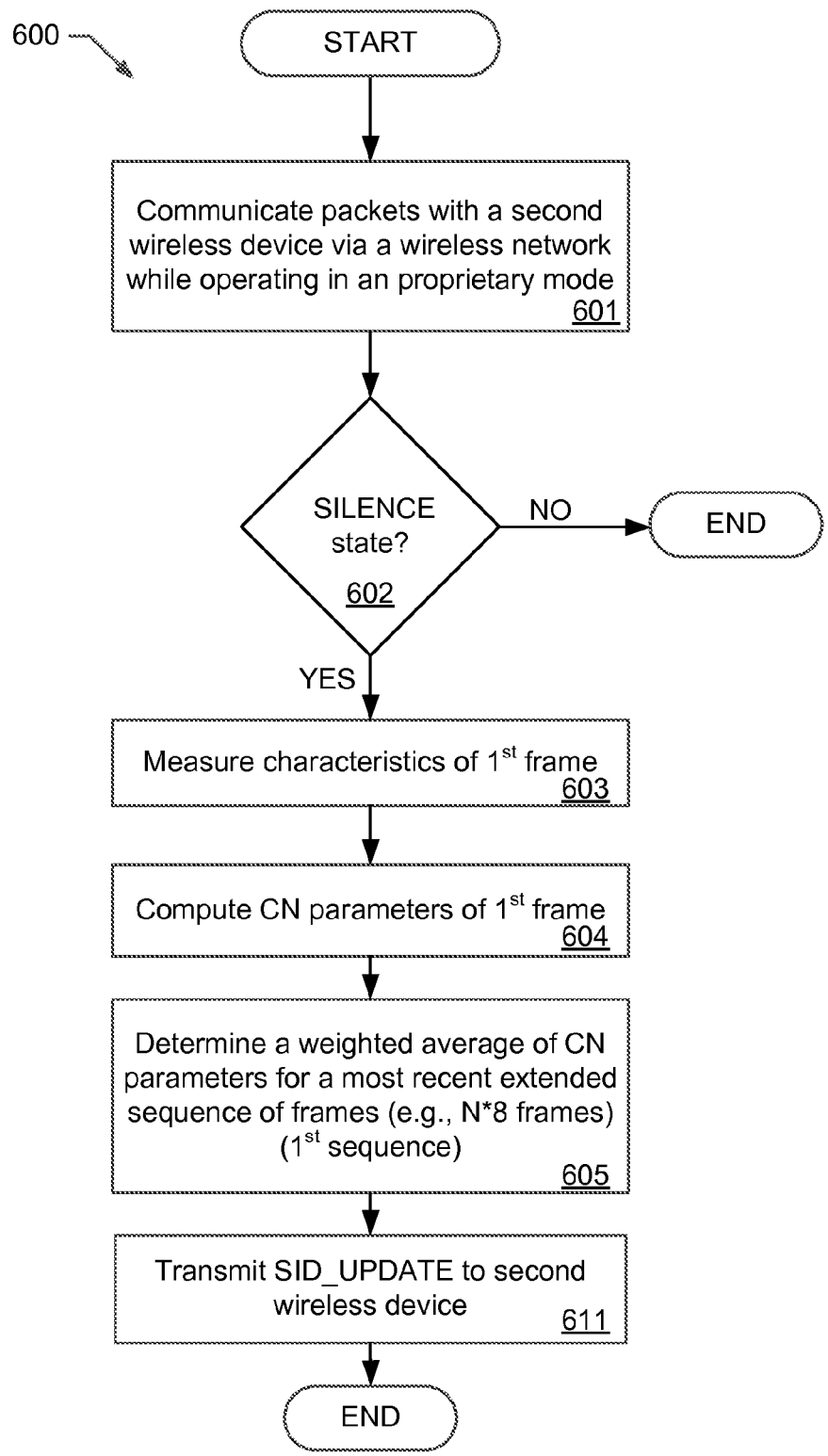
FIGS. 6A, 6B, 6C, and 6D illustrate additional flowcharts for determining SID_UPDATE frames in a DTX mode of operation, in accordance with some embodiments.

FIG. 6A illustrates a flowchart 600 for adjusting the time interval between SID_UPDATE frames, in accordance with some embodiments. Flowchart 600 illustrates an averaging period of N*8 frames, where N is an integer greater than one. Per FIG. 6A, the method includes the following steps performed at the UE 102:

Step 601: Communicate packets with a second wireless device via a wireless network while operating in a proprietary communication mode where the wireless device determines when the second wireless device is capable of transmitting a SID frame using an extended time period, e.g., a time period that exceeds eight speech frames.

Step 602: Is a SILENCE state detected? If yes, proceed to step 503. If no, the method ends.

Step 603: Measure one or more characteristics of a first speech frame received by the UE 102.

Step 604: Compute one or more CN parameters based on the measured one or more characteristics of the first speech frame. For an AMR codec, the CN parameters can be based on a set of weighted average LSF parameter vectors and a set of weighted average logarithmic frame energy parameters. For an AMR-WB codec, the CN parameters can be based on a set of weighted average ISF parameter vectors and a set of weighted average logarithmic frame energy parameters.

Step 605: Determine a weighted average of CN parameters of the most recent N*8 frames (first sequence), where the first frame is the most recent frame in the first sequence.

Step 611: Transmit a SID_UPDATE frame to the second wireless device every N*8 frames.

Figure 6B:
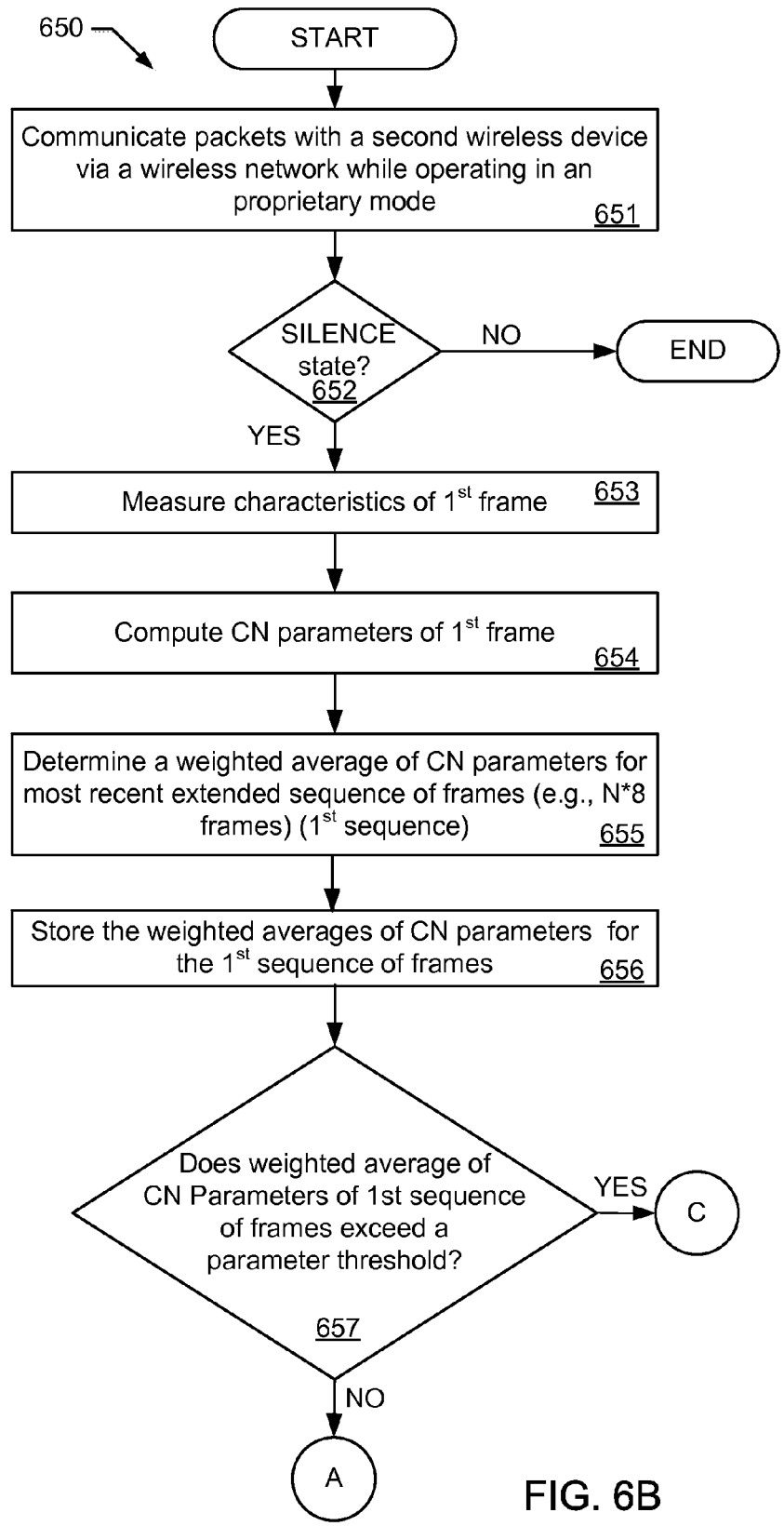
Figure 6C:
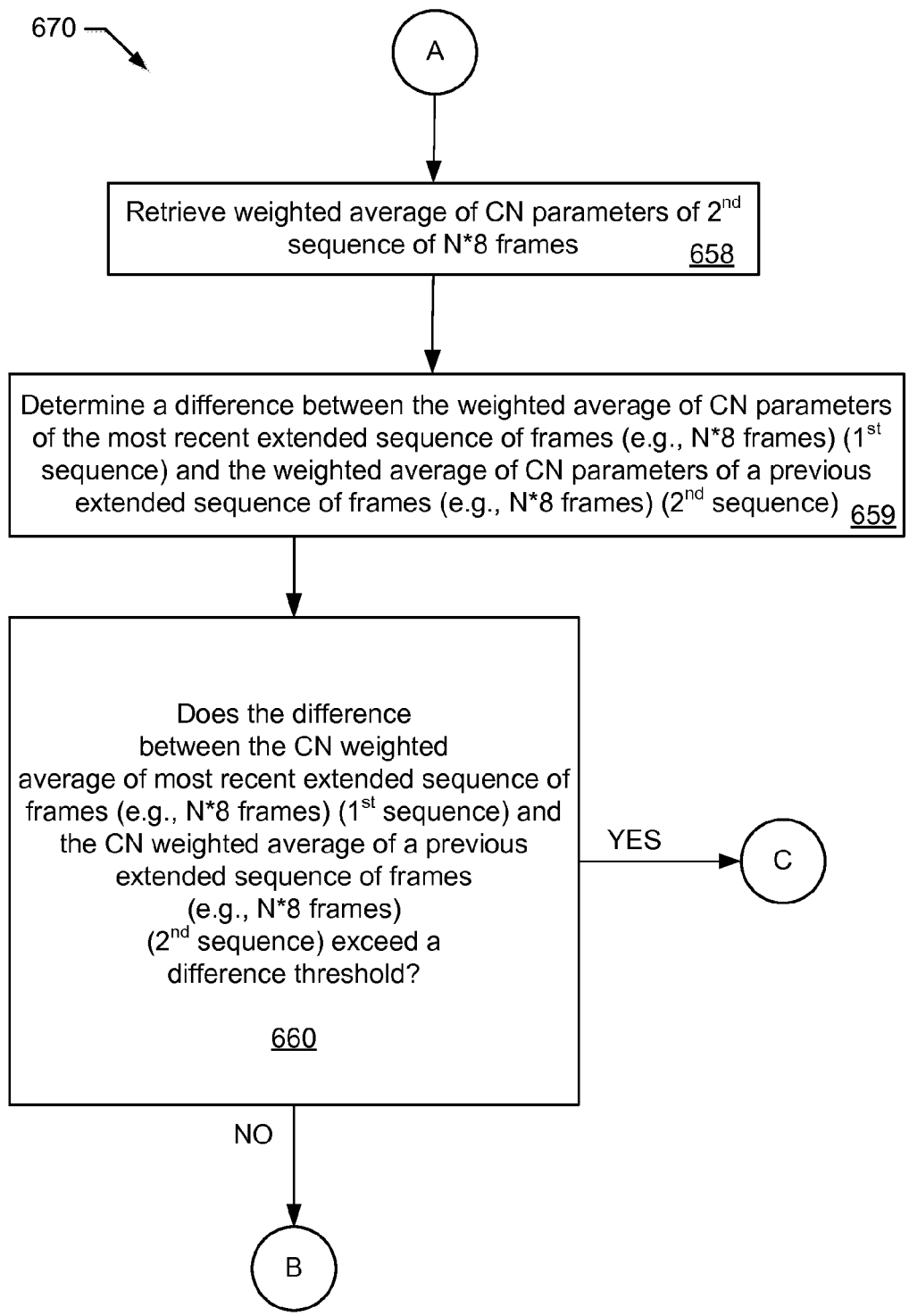
Figure 6D:
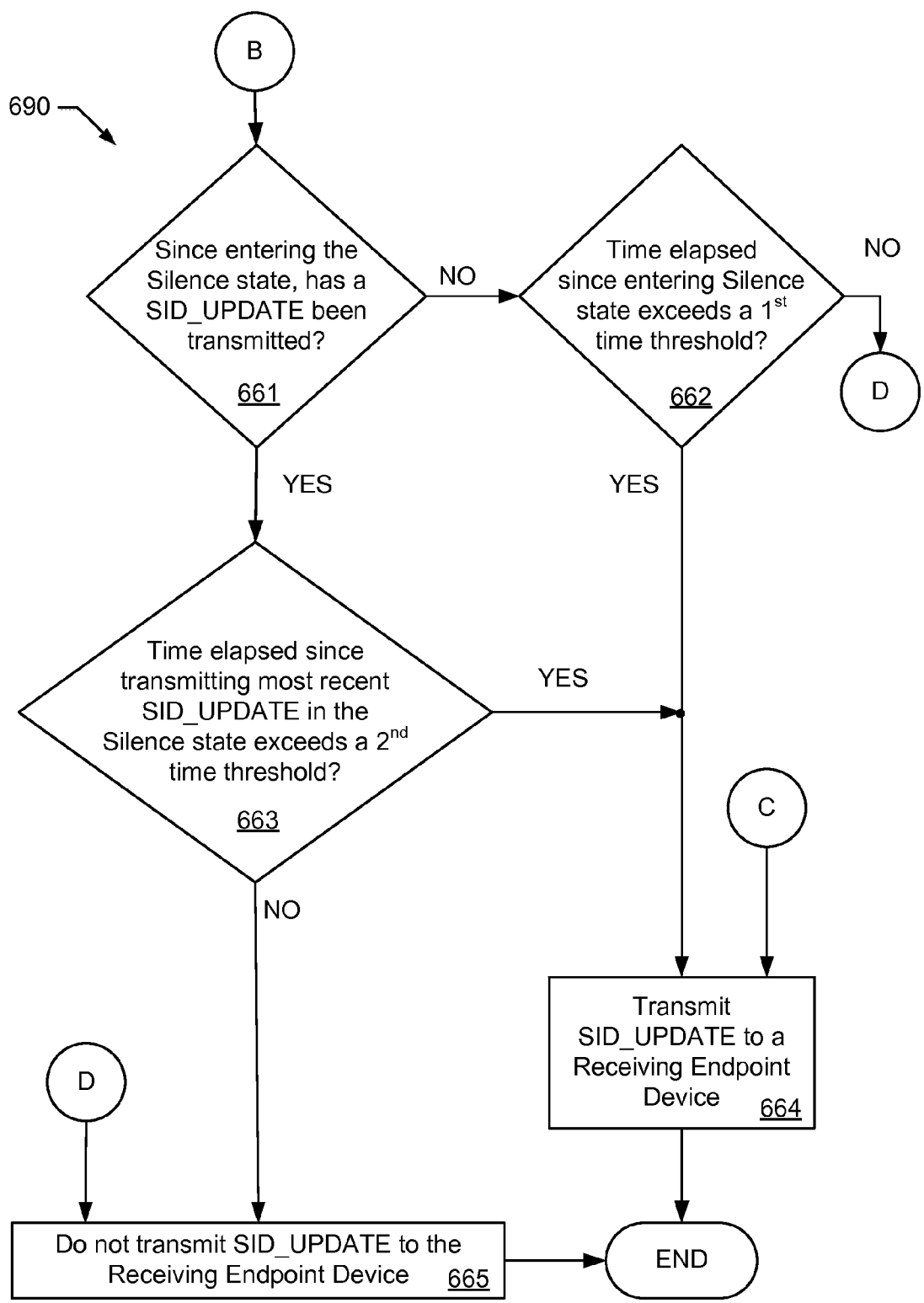

FIGS. 6B, 6C, and 6D illustrate additional flowcharts 650, 670, and 690 for adjusting a time interval between SID_UPDATE frames. Flowcharts 650, 670, and 690 combine elements of flowcharts 500, 550, 570, and 600, to increase an averaging period to N*8 frames and to apply one or more thresholds to decide whether to transmit a SID frame. Per flowcharts 650, 670, and 690, a representative method includes the following steps performed at the UE 102:

Step 651: Communicate packets with a second wireless device via a wireless network while operating in a proprietary communication mode where the wireless device determines when the second wireless device is capable of transmitting a SID frame using an extended time period, e.g., a time period that exceeds eight speech frames.

Step 652: Is a SILENCE state detected? If yes, proceed to step 653. If no, the method ends.

Step 653: Measure one or more characteristics of a first speech frame received by the UE 102.

Step 654: Compute one or more CN parameters based on the measured one or more characteristics of the first speech frame. For an AMR codec, the CN parameters can be based on a set of weighted, averaged LSF parameter vectors and a set of averaged logarithmic frame energy parameters. For an AMR-WB codec, the CN parameters can be based on a set of weighted, averaged ISF parameter vectors and a set of averaged logarithmic frame energy parameters.

Step 655: Determine a weighted average of CN parameters of the most recent extended sequence of N*8 speech frames (first sequence), where the first speech frame is the most recent frame in the first sequence.

Step 656: Store the weighted average of CN parameters for the first sequence of frames.

Step 657: Does the weighted average of CN parameters of the first sequence of speech frames exceed a parameter threshold? If yes, proceed to step 664, if no, proceed to step 658.

Step 658: Retrieve from storage a weighted average of CN parameters of a second extended sequence of N*8 speech frames (second sequence), where the second speech frame is the most recent speech frame in the second sequence.

Step 659: Determine a difference between the weighted average of CN parameters of the most recent extended sequence of N*8 speech frames (first sequence) and the weighted average of the CN parameters of the previous extended sequence of N*8 speech frames (second sequence)

Step 660: Does the difference between the CN weighted average of most recent extended sequence of N*8 speech frames (first sequence) and the CN weighted average of the previous extended sequence of N*8 speech frames (second sequence) exceed a difference threshold? If yes, proceed to step 664, if no, proceed to step 661.

Step 661: Since entering the Silence state, has a SID_UPDATE frame been transmitted? If yes, proceed to step 663. If no, proceed to step 662.

Step 662: Does the time since entering the Silence state exceed a first time threshold? If yes, proceed to step 664. If no, proceed to step 665.

Step 663: Does the time elapsed since transmitting the most recent SID_UPDATE exceed a second time threshold? If yes, proceed to step 664. If no, proceed to step 665.

Step 664: Transmit a SID_UPDATE frame to the second wireless device.

Step 665—Do not transmit a SID_UPDATE frame to the second wireless device.

In some embodiments, steps 657 and 661-663 can be optional steps. In some embodiments, one or more of the conditional tests illustrated in steps 657, 660, and 661-663 can be used alone or in combination to determine whether to send a SID_UPDATE frame. Thus, the method illustrated can include one or more tests for a parameter threshold, a difference threshold, and/or time thresholds.

In some embodiments, step 659 is executed as follows: For an AMR codec, the SID_UPDATE frame is not transmitted to the receiving endpoint device when a difference between the weighted average of the CN parameters, which include the LSF parameter vectors, for the first and second sequences is less than an LSF threshold. Conversely, when the difference between the weighted average of the CN parameters, which include the LSF parameter vectors, for the first and second sequences equals or exceeds the LSF threshold, the SID_UPDATE frame is transmitted. Similarly, for an AMR-WB codec, the SID_UPDATE frame is not transmitted to the receiving endpoint device when a difference between the weighted average of the CN parameters, which include the ISF parameter vectors, for the first and second sequences is less than an ISF threshold. Conversely, when the difference between the weighted average of the CN parameters, which include the ISF parameter vectors, for the first and second sequences equals or exceeds the ISF threshold, the SID_UPDATE frame is transmitted. In some embodiments, a comparison of logarithmic frame energy parameters can be used in place of or in addition to LSF/ISF parameter vectors to determine whether to send the SID_UPDATE frame to the receiving endpoint device, e.g., by comparing logarithmic frame energy parameter values (or averaged values) to an energy threshold.

Figure 7:
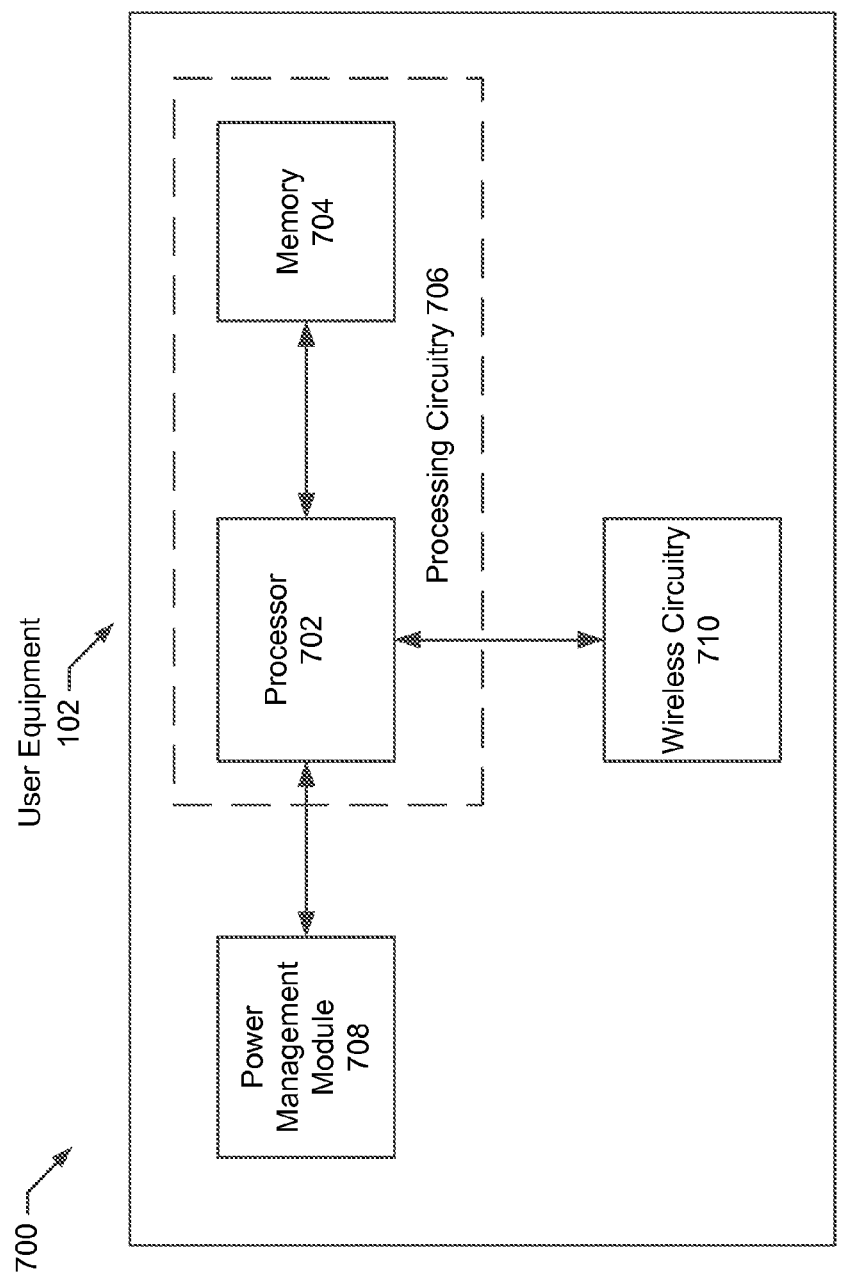
FIG. 7 illustrates a block diagram of a wireless communication device, in accordance with some embodiments.

FIG. 7 illustrates a block diagram of an apparatus 700 that can be implemented on UE 102, in accordance with some embodiments. The apparatus 700 of FIG. 7 can be configured to provide power optimization for the UE 102 using a VoLTE service while operating in a discontinuous transmission (DTX) mode, in accordance with one or more embodiments. It will be appreciated that the components, devices or elements illustrated in and described with respect to FIG. 7 may not be mandatory and thus some may be omitted in certain embodiments. Additionally, some embodiments can include further or different components, devices or elements beyond those illustrated in and described with respect to FIG. 7.

The apparatus 700 can include processing circuitry 706 that is configurable to perform actions in accordance with one or more embodiments disclosed herein. In this regard, the processing circuitry 706 can be configured to perform and/or control performance of one or more functionalities of the apparatus 700 in accordance with various embodiments, and thus can provide means for performing functionalities of the apparatus 700 in accordance with various embodiments. The processing circuitry 706 can be configured to perform data processing, application execution and/or other processing and management services according to one or more embodiments.

In some embodiments, the apparatus 700 or a portion(s) or component(s) thereof, such as the processing circuitry 706, can include one or more chipsets, which can each include one or more chips. The processing circuitry 706 and/or one or more further components of the apparatus 700 can therefore, in some instances, be configured to implement an embodiment on a chipset comprising one or more chips. In some example embodiments in which one or more components of the apparatus 700 are embodied as a chipset, the chipset can be capable of enabling a computing device, e.g., UE 102, to operate in the LTE wireless network 100 when implemented on or otherwise operably coupled to the computing device, e.g., UE 102. Thus, for example, one or more components of the apparatus 700 can provide a chipset configured to enable a computing device to communicate using one or more cellular wireless technologies. In some embodiments, the processing circuitry 706 can include a processor 702 and, in some embodiments, such as that illustrated in FIG. 7, can further include memory 704. The processing circuitry 706 can be in communication with or otherwise control wireless circuitry 710 and/or a power management module 708.

The processor 702 can be embodied in a variety of forms. For example, the processor 702 can be embodied as various processing hardware-based means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 702 can comprise a plurality of processors. The plurality of processors can be in operative communication with each other and can be collectively configured to perform one or more functionalities of the apparatus 700 as described herein. In some embodiments, the processor 702 can be configured to execute instructions that can be stored in the memory 704 or that can be otherwise accessible to the processor 702. As such, whether configured by hardware or by a combination of hardware and software, the processor 702 can be capable of performing operations according to various embodiments while configured accordingly.

In some embodiments, the memory 704 can include one or more memory devices. Memory 704 can include fixed and/or removable memory (or other storage) devices. In some embodiments, the memory 704 can provide a non-transitory computer-readable storage medium that can store computer program instructions that can be executed by the processor 702. In this regard, the memory 704 can be configured to store information, data, applications, instructions and/or the like for enabling the apparatus 700 to carry out various functions in accordance with one or more example embodiments. In some embodiments, the memory 704 can be in communication with one or more of the processor 702, wireless circuitry 710, or power management module 708 via one or more busses for passing information among components of the apparatus 700.

The apparatus 700 can further include wireless circuitry 710. The wireless circuitry 710 can be configured to enable the apparatus 700 to send wireless signals to and receive signals in accordance with one or more wireless networking technologies. As such, the wireless circuitry 710 can enable the apparatus 700 to send signals to and receive signals from an eNodeB 110 (or an equivalent) of a wireless network, e.g., LTE wireless network 100. In some embodiments, the wireless circuitry 710 includes hardware and/or software modules to perform operations to convert digital data to and/or from analog wireless radio frequency waveforms.

The apparatus 700 can further include power management module 708. The power management module 708 can be embodied as various means, such as circuitry, hardware, a computer program product comprising computer readable program instructions stored on a computer readable medium (for example, the memory 704) and executed by a processing device (for example, the processor 702), or some combination thereof. In some embodiments, the processor 702 (or the processing circuitry 706) can include, or otherwise control the power management module 708. The power management module 708 can be configured to perform and/or otherwise control power management in accordance with one or more embodiments disclosed herein. For example, power management module 708 can be configured to measure CN characteristics, determine weighted averages of the measured CN characteristics, and adjust SID frame transmission to manage power consumption by a wireless device, e.g., the UE 102. A CN parameter computation can include an evaluation algorithm that can be used to determine as set of unquantized Linear Prediction (LP) parameters, e.g., using an ISF or LSF representation.

In some embodiments, a wireless communication device configured to manage power consumption in a discontinuous transmission (DTX) mode in communication with a Long Term Evolution (LTE) network includes wireless circuitry 710 configured to transmit frames to and receive frames from a wireless network; power management module 708 coupled to processing circuitry 706, where the power management module 708 is configured to detect voice inactivity and to measure one or more characteristics of a first frame received by the wireless communication device; and the processing circuitry 706 coupled with the wireless circuitry 710, wherein the processing circuitry 706 is configured to:

generate one or more CN parameters based on the measured one or more characteristics of the first frame;

determine a weighted average of CN parameters for a first sequence of frames, where the first sequence of frames is the most recent sequence of frames and the first frame is the most recent frame in the first sequence of frames;

store the weighted average of CN parameters for the first sequence of frames in a memory 704 (or in other suitable storage);

retrieve from memory 704 (or from other suitable storage) a weighted average of CN parameters for a second sequence of frames, wherein the weighted average of CN parameters of the second sequence of frames is based on a sequence where the second frame is most recent frame in the second sequence of frames;

determine when the difference between the weighted average of CN parameters of the first sequence of frames and the weighted average of CN parameters of the second sequence of frames exceeds a difference threshold; and transmit one or more silence descriptor update (SID_UPDATE) frames when the difference between the weighted average of CN parameters of the first sequence of frames and the weighted average of CN parameters of the second sequence of frames exceeds the difference threshold.

The aforementioned methods can be implemented at a wireless communication device, e.g., the UE 102. In an embodiment, the UE 102 determines when voice inactivity occurs, e.g., a SILENCE state. When voice inactivity occurs, the UE 102 measures characteristics of the first frame received. For an AMR codec, the characteristics can include a set of LSF parameter vectors and a set of logarithmic frame energy parameters. For an AMR-WB codec, the characteristics can include a set of ISF parameter vectors and a set of logarithmic frame energy parameters. Using the measured characteristics of the first frame, the UE 102 can generate CN parameters and determine a weighted average of comfort noise parameters of the first sequence, when a first sequence of frames is the most recent sequence of frames and the first frame is the most recent frame in the first sequence of frames. The UE 102 determines a difference between the weighted average of the CN parameters of the first sequence of frames and a weighted average of the CN parameters of the second sequence of frames. When the difference between the weighted averages exceeds a difference threshold, the UE 102 sends a SID frame to a second wireless device to notify the second wireless device of the voice inactivity. After sending the SID frame, the UE 102 powers down all or portions of a transmitter to conserve power. The method allows the UE 102 to control timing for the transmission of SID frames, as compared with current LTE wireless communication protocols. The averaging period can be adjusted from a fixed length of eight frames to a length of N*8 frames, where N is an integer greater than one and is determined at least in part by the CN parameters. In some embodiments, the value for N is adapted over time based on the CN parameters. The methods described herein allow the UE 102 to optimize power consumption while maintaining voice quality.

The embodiments described herein relate to methods and apparatus for power saving for LTE wireless networks while using VoLTE service operating in a DTX mode. Multiple LTE specifications have been developed and ratified by the 3GPP. Generally, the term "LTE" refers to 3GPP Releases 8 and 9 and the term "LTE Advanced" refers to 3GPP Releases 10 to 13. LTE and LTE Advanced can be referred to as the $4^{th}$ generation mobile networks (4G). Beyond 4G, 3GPP can continue to develop new specifications with future releases referred to as $5^{th}$ generation mobile networks (5G). The specifications for the 5G mobile networks are expected to support packet-based voice and data communications. One skilled in the art can recognize that the described embodiments can be applied to wireless networks that use packet-based voice transmission with silence detection, such as under development for 5G wireless systems, and are not limited solely to 4G/LTE/VoLTE wireless systems. Any wireless system that uses packet-based voice with silence detection and silence update frames can benefit from the methods, apparatuses, and systems described herein.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A method for reducing power consumption of a user equipment (UE), the method comprising:
   at the UE while operating in a discontinuous transmission (DTX) mode in communication with a second UE via a Long Term Evolution (LTE) wireless network:
   detecting a period of voice inactivity;
   measuring one or more characteristics of a first speech frame;
   computing one or more comfort noise parameters based on the measured characteristics of the first speech frame;
   determining a weighted average of comfort noise parameters of a first sequence of speech frames, the first sequence including the first speech frame as a most recent speech frame;
   determining a difference between the weighted average of the comfort noise parameters of the first sequence of speech frames and a weighted average of comfort noise parameters of a second previous sequence of speech frames, the second previous sequence including a second speech frame different from and earlier than the first speech frame as a most recent speech frame; and
   transmitting one or more silence descriptor update (SID_UPDATE) frames to the second UE via the LTE wireless network when the difference between the weighted average of the comfort noise parameters of the first sequence of speech frames and the weighted average of the comfort noise parameters of the second sequence of speech frames exceeds a difference threshold,
   wherein the first sequence of speech frames and the second sequence of speech frames each (a) span an identical number of consecutive speech frames, (b) overlap by at least one speech frame, and (c) are offset by at least one speech frame.

2. The method as recited in claim 1, further comprising withholding transmission of SID_UPDATE frames to the second UE when the difference between the weighted average of the comfort noise parameters of the first sequence of speech frames and the weighted average of the comfort noise parameters of the second sequence of speech frames does not exceed the difference threshold.

3. The method as recited in claim 1, further comprising:
   storing the weighted average of the comfort noise parameters of the first sequence of speech frames; and
   retrieving from storage the weighted average of the comfort noise parameters of the second sequence of speech frames.

4. The method as recited in claim 1, further comprising transmitting the one or more SID_UPDATE frames to the second UE via the LTE wireless network, when the weighted average of the comfort noise parameters of the first sequence of speech frames exceeds a parameter threshold.

5. The method as recited in claim 1, further comprising:
   after entering a SILENCE state, transmitting to the second UE via the LTE wireless network at least one SID_UPDATE frame, when no SID_UPDATE frame has been transmitted and a time elapsed since entering the SILENCE state exceeds a first time threshold.

6. The method as recited in claim 1, further comprising:
   after entering a SILENCE state, transmitting to the second UE via the LTE wireless network at least one SID_UPDATE frame, when a first SID_UPDATE frame has been transmitted and a time elapsed since transmitting a most recent SID_UPDATE frame while in the SILENCE state exceeds a second time threshold.

7. The method as recited in claim 1, wherein a time interval between successive transmitted SID_UPDATE frames equals or exceeds the number of consecutive speech frames in the first sequence of speech frames.

8. A wireless communication device comprising:
   wireless circuitry configured to communicate with a wireless network;
   a power management module communicatively coupled to processing circuitry, wherein the power management module is configured to detect voice inactivity and measure characteristics of speech frames including a first speech frame; and
   the processing circuitry communicatively coupled to the wireless circuitry, wherein the processing circuitry is configured to cause the wireless communication device to:
   generate comfort noise parameters based on measured characteristics of speech frames including the first speech frame;
   determine a weighted average of the comfort noise parameters of a first sequence of speech frames, the first sequence including the first speech frame as a most recent speech frame;

determine a difference between the weighted average of the comfort noise parameters of the first sequence of speech frames and a weighted average of comfort noise parameters of a second sequence of speech frames, the second sequence including a second speech frame different from and earlier than the first speech frame; and transmit one or more silence descriptor update (SID_UPDATE) frames to a second wireless communication device via the wireless network when the difference between the weighted average of the comfort noise parameters of the first sequence of speech frames and the weighted average of the comfort noise parameters of the second sequence of speech frames exceeds a difference threshold, wherein the first sequence of speech frames and the second sequence of speech frames each (a) span an identical number of consecutive speech frames, (b) overlap by at least one speech frame, and (c) are offset by at least one speech frame.

9. The wireless communication device as recited in claim 8, wherein the processing circuitry is further configured to:
store the weighted average of the comfort noise parameters of the first sequence of speech frames in a memory; and
retrieve from memory the weighted average of the comfort noise parameters of the second sequence of speech frames.

10. The wireless communication device as recited in claim 8, wherein the comfort noise parameters comprise a set of immittance spectral frequency (ISF) parameter vectors and/or a set of logarithmic frame energy parameters.

11. The wireless communication device as recited in claim 8, wherein the comfort noise parameters comprise a set of line spectral frequency (LSF) parameter vectors and/or a set of logarithmic frame energy parameters.

12. The wireless communication device as recited in claim 8, wherein the processing circuitry is further configured to:
transmit one or more SID_UPDATE frames to the second wireless communication device via the wireless network, when the weighted average of the comfort noise parameters of the first sequence of speech frames exceeds a parameter threshold.

13. A non-transitory computer readable storage medium storing computer program code that, when executed by one or more processors implemented on a user equipment (UE) operating in a discontinuous transmission (DTX) mode in communication with a second UE via a wireless network, causes the UE to perform a method comprising:
in response to detecting a period of voice inactivity:
measuring characteristics of a first speech frame;
generating comfort noise parameters based on the measured characteristics of the first speech frame;
determining a weighted average of the comfort noise parameters of a first sequence of speech frames, the first sequence including the first speech frame as a most recent speech frame;
determining a difference between the weighted average of the comfort noise parameters of the first sequence of speech frames and a weighted average of comfort noise parameters of a second sequence of speech frames, the second sequence including a second speech frame different from and earlier than the first speech frame; and
transmitting one or more silence descriptor update (SID_UPDATE) frames to the second UE when the difference between the weighted average of the comfort noise parameters of the first sequence of speech frames and the weighted average of the comfort noise parameters of the second sequence of speech frames exceeds a difference threshold, wherein:
the first sequence of speech frames comprises a first set of N*8 most recent speech frames, where N is an integer greater than one,
the second sequence of speech frames comprises a second set of N*8 speech frames that overlaps and is offset from the first set by at least one speech frame, and
each SID_UPDATE frame is spaced apart by a time period that exceeds a time span of eight successive speech frames.

14. The non-transitory computer readable storage medium as recited in claim 13, wherein the comfort noise parameters comprise a set of immittance spectral frequency (ISF) parameter vectors and/or a set of logarithmic frame energy parameters.

15. The non-transitory computer readable storage medium as recited in claim 13, wherein the comfort noise parameters comprise a set of line spectral frequency (LSF) parameter vectors and/or a set of logarithmic frame energy parameters.

16. The non-transitory computer readable storage medium as recited in claim 13, wherein the integer N varies based on the comfort noise parameters.

17. The non-transitory computer readable storage medium as recited in claim 13, wherein the time period separating successively transmitted SID_UPDATE frames equals a time period of N*8 successive speech frames.

18. The non-transitory computer readable storage medium as recited in claim 13, wherein the time period separating successively transmitted SID_UPDATE frames varies over time based on the comfort noise parameters.

19. The method of claim 1, wherein a time interval between successive SID_UPDATE frames equals or exceeds a time span of eight successive speech frames.

20. The non-transitory computer readable storage medium as recited in claim 13, wherein the method performed by the UE further comprises:
transmitting one or more SID_UPDATE frames to the second UE via the wireless network, when the weighted average of the comfort noise parameters of the first sequence of speech frames exceeds a parameter threshold.

* * * * *